(12) United States Patent
Chen et al.

(10) Patent No.: US 12,555,362 B2
(45) Date of Patent: Feb. 17, 2026

(54) NEURAL NETWORK MODEL TRAINING METHOD, IMAGE PROCESSING METHOD, AND APPARATUS

(71) Applicant: HUAWEI TECHNOLOGIES CO., LTD., Guangdong (CN)

(72) Inventors: Xianping Chen, Xi'an (CN); Li Ma, Shenzhen (CN); Yong Qin, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 18/316,365

(22) Filed: May 12, 2023

(65) Prior Publication Data

US 2023/0281973 A1 Sep. 7, 2023

Related U.S. Application Data

(63) Continuation of application No. PCT/CN2021/111833, filed on Aug. 10, 2021.

(30) Foreign Application Priority Data

Nov. 13, 2020 (CN) .......................... 202011267240.X

(51) Int. Cl.
*G06V 10/774* (2022.01)
*G06N 3/084* (2023.01)
*G06V 10/82* (2022.01)

(52) U.S. Cl.
CPC .......... *G06V 10/774* (2022.01); *G06N 3/084* (2013.01); *G06V 10/82* (2022.01)

(58) Field of Classification Search
CPC ...... G06N 3/044; G06N 3/0464; G06N 3/063; G06N 3/084; G06N 3/09; G06N 3/098; G06V 10/774; G06V 10/82
See application file for complete search history.

(56) References Cited

U.S. PATENT DOCUMENTS 10,901,815 B2 * 1/2021 Chen ................... G06N 3/063
2018/0005115 A1 * 1/2018 Gokmen .............. G06N 3/084
(Continued)

FOREIGN PATENT DOCUMENTS

CN 111291869 A 6/2020

OTHER PUBLICATIONS

Jichen Wang et al., Efficient Hardware Architectures for Deep Convolutional Neural Network, Nov. 22, 2017, IEEE Transactions on Circuits and Systems-I: Regular Papers, vol. 65, No. 6, Jun. 2018, pp. 1941-1950.*

(Continued)

*Primary Examiner* — Omar S Ismail

(57) ABSTRACT

The technology of this application relates to a neural network model training method, an image processing method, and an apparatus in the artificial intelligence. The training method includes each of at least one first accelerator training a neural network model based on at least one training sample. Before forward computation at an $i^{th}$ layer is performed, different parameters of the $i^{th}$ layer are obtained locally and from another accelerator, to obtain a complete model parameter of the $i^{th}$ layer. According to the method in this application, storage pressure of the first accelerator can be reduced.

20 Claims, 15 Drawing Sheets

(56) References Cited

U.S. PATENT DOCUMENTS

| | | | | |
|---|---|---|---|---|
| 2019/0080223 | A1* | 3/2019 | Fraser | G06N 3/04 |
| 2019/0332944 | A1* | 10/2019 | Bai | G06N 3/04 |
| 2020/0097826 | A1* | 3/2020 | Du | G06N 3/063 |
| 2020/0387799 | A1* | 12/2020 | Vivekraja | G06N 3/044 |
| 2020/0394458 | A1* | 12/2020 | Yu | G06V 10/25 |
| 2021/0182077 | A1* | 6/2021 | Chen | G06F 40/263 |
| 2021/0224069 | A1* | 7/2021 | Chen | G06F 9/3001 |
| 2021/0374518 | A1* | 12/2021 | Zhu | G06N 3/04 |

OTHER PUBLICATIONS

Yiran Chen et al., "A Survey of Accelerator Architectures for Deep Neural Networks," Jan. 29, 2020, Engineering 6 (2020), pp. 265-272.*

Tayfun Gokmen et al., "Acceleration of Deep Neural Network Training with Resistive Cross-Point Devices: Design Considerations," Jul. 21, 2016, Frontiers in Neuroscience, Jul. 2016, vol. 10, Article 333, pp. 1-12.*

Vivienne Sze et al., "Efficient Processing of Deep Neural Networks: A Tutorial and Survey," Nov. 20, 2017, Proceedings of the IEEE, vol. 105, No. 12, Dec. 2017 , pp. 2295-2322.*

Lei Deng et al.,"Model Compression and Hardware Acceleration for Neural Networks: A Comprehensive Survey," Apr. 8, 2020, Proceedings of the IEEE,vol. 108, No. 4, Apr. 2020,pp. 485-519.*

Qianru Zhang et al.,"Recent advances in convolutional neural network acceleration," Sep. 21, 2018,Neurocomputing 323 (2019),pp. 37-45.*

Aaron Harlap et al, "PipeDream: Fast and Efficient Pipeline Parallel DNN Training", Jun. 8, 2018, arXiv: 1806.03377v1 [cs.DC] Jun. 8, 2018, XP093309527,pp. 1-12.*

Extended European Search Report for EP Application No. 21890694.9 dated Mar. 6, 2024, 10 pages.

Aaron Harlap et al, "PipeDream: Fast and Efficient Pipeline Parallel DNN Training", arXiv: 1806.03377v1 [cs.DC] Jun. 8, 2018, XP093309527, total 14 pages.

* cited by examiner

1300

NEURAL NETWORK MODEL TRAINING METHOD, IMAGE PROCESSING METHOD, AND APPARATUS

CROSS-REFERENCE TO RELATED APPLICATIONS

This application is a continuation of International Application No. PCT/CN2021/111833, filed on Aug. 10, 2021, which claims priority to Chinese Patent Application No. 202011267240.X, filed on Nov. 13, 2020. The disclosures of the aforementioned applications are hereby incorporated by reference in their entireties.

TECHNICAL FIELD

This application relates to the artificial intelligence field, and more specifically, to a neural network model training method, an image processing method, and an apparatus.

BACKGROUND

Artificial intelligence (AI) is a theory, a method, a technology, or an application system that simulates, extends, and expands human intelligence by using a digital computer or a machine controlled by the digital computer, to sense an environment, obtain knowledge, and obtain an optimal result based on the knowledge. In other words, artificial intelligence is a branch of computer science, and attempts to understand essence of intelligence and produce a new intelligent machine that can react in a similar manner to human intelligence. Artificial intelligence is to research design principles and implementation methods of various intelligent machines, so that the machines have perception, inference, and decision-making functions. Research in the artificial intelligence field includes robotics, natural language processing, computer vision, decision-making and inference, human-machine interaction, recommendation and search, AI basic theories, and the like.

In the artificial intelligence field, a target neural network model with better performance can be obtained by training a neural network model, to perform various data processing work. A training device needs to store a complete model parameter to execute a neural network model training process. However, a memory size of a single device is limited, and there are a large quantity of model parameters in a deep model, which exerts high storage pressure to the device. A device with small memory cannot even store the complete model parameter, and it is difficult to execute the neural network model training process.

Therefore, how to reduce storage pressure of an operation device in the neural network model becomes a technical problem that needs to be resolved.

SUMMARY

This application provides a neural network model training method, an image processing method, and an apparatus, to reduce storage pressure of an operation device of a neural network model.

According to a first aspect, a neural network model training method is provided. The method includes: Each of at least one first accelerator obtains at least one training sample; each of the at least one first accelerator performs forward computation of a neural network model on the at least one training sample, to obtain a forward computation result, where before performing forward computation at an $i^{th}$ layer in the neural network model, the at least one first accelerator obtains different parameters of the $i^{th}$ layer locally and from another accelerator, to obtain a complete model parameter of the $i^{th}$ layer, where i is a positive integer; the at least one first accelerator separately performs backward computation based on the forward computation result, to obtain a first parameter gradient of the neural network model; and the at least one first accelerator separately updates a parameter of the neural network model based on the first parameter gradient of the neural network model.

According to the solution in this embodiment of this application, different parts of the parameter of the neural network model may be stored in a plurality of accelerators, and the first accelerator may obtain a required parameter from another device, and complete forward computation of the neural network model. Required memory is far less than memory required for storing the complete neural network model, to reduce storage pressure of the first accelerator, and avoid a case in which the neural network model cannot be trained because of insufficient memory of the first accelerator.

In addition, the at least one first accelerator can implement data parallel model training, to improve model training efficiency.

In addition, compared with an inter-layer segmentation manner, in an intra-layer segmentation manner in which different parameters of a same layer are obtained from different accelerators, communication congestion caused when a plurality of accelerators obtain a parameter from a same accelerator during distributed training can be avoided, and processing efficiency can be improved.

All layers whose parameter needs to be obtained from another accelerator in a forward computation process of the neural network model may be understood as the $i^{th}$ layer.

With reference to the first aspect, in some implementations of the first aspect, the method further includes: After performing forward computation at the $i^{th}$ layer in the neural network model, the at least one first accelerator releases a parameter that is of the $i^{th}$ layer and that is obtained from the another accelerator.

According to the solution in this embodiment of this application, after forward computation is completed, a parameter obtained from another accelerator is released, so that space occupied by a model parameter in a training process can be reduced. In this way, each accelerator can support more training samples, linearity of a training cluster is improved, and efficient training of the neural network model is implemented.

With reference to the first aspect, in some implementations of the first aspect, before performing backward computation at a $j^{th}$ layer in the neural network model, the at least one first accelerator obtains different parameters of the $j^{th}$ layer locally and from another first accelerator, to obtain a complete model parameter of the $j^{th}$ layer, where j is a positive integer.

According to the solution in this embodiment of this application, the parameter obtained from the another device may be released after forward computation is completed, and a required parameter is obtained again in a backward computation process, to reduce storage space occupied by the parameter in the training process.

All layers whose parameter needs to be obtained from another accelerator in a backward computation process of the neural network model may be understood as the $j^{th}$ layer.

With reference to the first aspect, in some implementations of the first aspect, the method further includes: After performing backward computation at the $j^{th}$ layer in the neural network model, the at least one first accelerator releases a parameter that is of the $j^{th}$ layer and that is obtained from the another accelerator.

According to the solution in this embodiment of this application, after backward computation is completed, the parameter obtained from the another accelerator is released, so that the space occupied by the model parameter in the training process can be further reduced, and the storage space occupied by the parameter in the entire training process can be small. In this way, each accelerator can support more training samples, the linearity of the training cluster is improved, and efficient training of the neural network model is implemented.

With reference to the first aspect, in some implementations of the first aspect, in a time period in which the at least one first accelerator performs backward computation at any one or more layers after the $j^{th}$ layer in the neural network model, the at least one first accelerator obtains the different parameters of the $j^{th}$ layer locally and from the another accelerator, to obtain the complete model parameter of the $j^{th}$ layer.

Obtaining a parameter and backward computation are overlapped, to reduce a communication time period that cannot be hidden in the computation process, improve training efficiency, and improve training performance of the cluster.

It should be noted that, obtaining a parameter of another layer in a time period of backward computation at a current layer may be understood as performing an operation of obtaining the parameter of the another layer in the time period of backward computation at the current layer. It is not specified that a time period in which the parameter of the another layer is obtained completely falls within the time period of backward computation at the current layer.

With reference to the first aspect, in some implementations of the first aspect, in a time period in which the at least one first accelerator performs forward computation at any one or more layers before the $i^{th}$ layer in the neural network model, the at least one first accelerator obtains the different parameters of the $i^{th}$ layer locally and from the another accelerator, to obtain the complete model parameter of the $i^{th}$ layer.

Obtaining a parameter and forward computation are overlapped, to reduce the communication time period that cannot be hidden in the computation process, improve training efficiency, and improve training performance of the cluster.

It should be noted that, obtaining a parameter of another layer in a time period of forward computation at a current layer may be understood as performing an operation of obtaining the parameter of the another layer in the time period of forward computation at the current layer. It is not specified that a time period in which the parameter of the another layer is obtained completely falls within the time period of forward computation at the current layer.

With reference to the first aspect, in some implementations of the first aspect, the at least one first accelerator is located in a first server.

With reference to the first aspect, in some implementations of the first aspect, the method further includes: Each of the at least one first accelerator sends the first parameter gradient to the another accelerator.

In this way, the another accelerator may update a locally stored parameter of the neural network model based on the first parameter gradient.

With reference to the first aspect, in some implementations of the first aspect, the at least one first accelerator sends a parameter gradient of a $k^{th}$ layer in the first parameter gradient to the another accelerator in a time period in which the at least one first accelerator performs backward computation at any one or more layers before the $k^{th}$ layer in the neural network model, where k is a positive integer.

Synchronization of a parameter gradient and backward computation are overlapped, to reduce the communication time period that cannot be hidden in the computation process, improve training efficiency, and improve training performance of the cluster.

It should be noted that, synchronizing a parameter gradient of another layer in the time period of backward computation at the current layer may be understood as performing an operation of synchronizing the parameter gradient of the another layer in the time period of backward computation at the current layer. It is not specified that a time period in which the parameter gradient of the another layer is synchronized completely falls within the time period of backward computation at the current layer.

With reference to the first aspect, in some implementations of the first aspect, the method further includes: Each of the at least one first accelerator receives a second parameter gradient that is of the neural network model and that is sent by the another accelerator; and that each of the at least one first accelerator updates a parameter of the neural network model based on the first parameter gradient of the neural network model includes: each of the at least one first accelerator updates the parameter of the neural network model based on the first parameter gradient of the neural network model and the second parameter gradient of the neural network model.

Compared with a case in which a model parameter is updated based on only a parameter gradient obtained through computation by the first accelerator, in a case in which a parameter is updated based on a parameter gradient in another accelerator and the parameter gradient obtained through computation by the first accelerator, more training samples can be used, and the parameter of the neural network model is updated based on an accumulated parameter gradient, to obtain an optimal value that can better approximate the parameter, and improve model training accuracy.

With reference to the first aspect, in some implementations of the first aspect, the at least one first accelerator includes two or more first accelerators; and that each of the at least one first accelerator receives a second parameter gradient that is of the neural network model and that is sent by the another accelerator includes: Each of the at least one first accelerator receives simultaneously the second parameter gradient that is of the neural network model and that is sent by an accelerator in another server.

In this way, when the server is a multi-network interface card server, a parameter gradient may be synchronized by using a plurality of network interface cards simultaneously, to reduce time costs, improve communication efficiency, and further improve model training efficiency.

According to a second aspect, an image processing method is provided. The method includes: A second accelerator obtains a to-be-processed image; and the second accelerator performs forward computation of a target neural network model on the to-be-processed image, to obtain a processing result of the to-be-processed image, where before performing forward computation at a $p^{th}$ layer in the target neural network model, the second accelerator obtains different parameters of the $p^{th}$ layer locally and from another accelerator, to obtain a complete model parameter of the $p^{th}$ layer, where p is a positive integer.

According to the solution in this embodiment of this application, the second accelerator stores only a part of the neural network model, and obtains a required parameter from another accelerator before performing forward computation. Required memory is far less than memory required for storing a complete neural network model, to reduce storage pressure of the second accelerator.

In addition, compared with an inter-layer segmentation manner, in this embodiment of this application in which a model parameter is stored in an intra-layer segmentation manner, the second accelerator obtains different parameters of a same layer from a plurality of accelerators, to obtain a complete parameter of the layer, so that a communication time period can be reduced, and processing efficiency can be improved.

With reference to the second aspect, in some implementations of the second aspect, after performing forward computation at the $p^{th}$ layer in the target neural network model, the second accelerator releases a parameter that is of the $p^{th}$ layer and that is obtained from the another accelerator.

According to the solution in this embodiment of this application, a parameter obtained from another device may be released after forward computation is completed, so that storage space occupied by the parameter in an operation process is reduced.

With reference to the second aspect, in some implementations of the second aspect, in a time period in which the second accelerator performs forward computation at any one or more layers before the $p^{th}$ layer in the target neural network model, the second accelerator obtains the different parameters of the $p^{th}$ layer locally and from the another accelerator, to obtain the complete model parameter of the $p^{th}$ layer.

According to the solution in this embodiment of this application, obtaining a parameter and forward computation are overlapped, to reduce a communication time period that cannot be hidden in a computation process, improve inference efficiency, and reduce time costs.

With reference to the second aspect, in some implementations of the second aspect, a parameter of the target neural network model is obtained by updating a parameter of a neural network model by each of at least one first accelerator based on a first parameter gradient of the neural network model, the first parameter gradient of the neural network model is obtained by performing backward computation by the at least one first accelerator based on a forward computation result, the forward computation result is obtained by performing forward computation of the neural network model on at least one training sample by each of the at least one first accelerator, and a complete model parameter of an $i^{th}$ layer in the neural network model is obtained by obtaining different parameters of the $i^{th}$ layer locally and from another accelerator.

It should be understood that, in the image processing method in the second aspect, the target neural network model may be obtained in the neural network model training method in the first aspect. The target neural network model may be a trained neural network model, and the to-be-processed image may be processed by using the trained neural network model.

In this application, because the target neural network model is obtained in the method in the first aspect, and more satisfies or is closer to an application requirement of the neural network model, a good processing effect can be obtained by performing image processing by using such a neural network model.

In this embodiment of this application, the first accelerator stores only a part of the neural network model, and obtains a required parameter from another accelerator before performing forward computation. Required memory is far less than memory required for storing a complete neural network model, to reduce storage pressure of the first accelerator, and avoid a case in which the neural network model cannot be trained due to insufficient memory of the first accelerator.

In addition, compared with an inter-layer segmentation manner, in this embodiment of this application in which a model parameter is stored in an intra-layer segmentation manner, the first accelerator obtains different parameters of a same layer from a plurality of accelerators, to obtain a complete parameter of the layer, so that a communication time period can be reduced, and processing efficiency can be improved. Further, communication congestion caused when a plurality of accelerators obtain a parameter from a same accelerator during distributed training can be avoided, and processing efficiency can be improved.

With reference to the second aspect, in some implementations of the second aspect, when the at least one first accelerator performs backward computation at a $j^{th}$ layer in the neural network model, a complete model parameter of the $j^{th}$ layer in the neural network model is obtained by obtaining different parameters of the $j^{th}$ layer locally and from the another accelerator.

According to a third aspect, a neural network model training apparatus is provided. The apparatus includes a module or unit configured to perform a method performed by a first accelerator in any one of the first aspect and the implementations of the first aspect.

According to a fourth aspect, an image processing apparatus is provided. The apparatus includes a module or unit configured to perform a method performed by a second accelerator in any one of the second aspect and the implementations of the second aspect.

It should be understood that extensions to, limitations on, explanations for, and description of related content in the first aspect are also applicable to same content in the second aspect, the third aspect, and the fourth aspect.

According to a fifth aspect, a neural network model training apparatus is provided. The apparatus includes: a memory, configured to store a program; and a processor, configured to execute the program stored in the memory. When the program stored in the memory is executed, the processor is configured to perform a method performed by a first accelerator in any one of the first aspect and the implementations of the first aspect.

The processor in the fifth aspect may be a central processing unit (CPU), or may be a combination of a CPU and a neural network operation processor. The neural network operation processor herein may include a graphics processing unit (GPU), a neural-network processing unit (NPU), a tensor processing unit (TPU), and the like. The TPU is an artificial intelligence accelerator-specific integrated circuit customized by Google® for machine learning.

According to a sixth aspect, an image processing apparatus is provided. The apparatus includes: a memory, configured to store a program; and a processor, configured to execute the program stored in the memory. When the program stored in the memory is executed, the processor is configured to perform a method performed by a second accelerator in any one of the second aspect and the implementations of the second aspect.

The processor in the sixth aspect may be a central processing unit, or may be a combination of a CPU and a neural network operation processor. The neural network operation processor herein may include a graphics processing unit, a neural-network processing unit, a tensor processing unit, and the like. The TPU is an artificial intelligence accelerator-specific integrated circuit customized by Google® for machine learning.

According to a seventh aspect, a computer-readable medium is provided. The computer-readable medium stores program code to be executed by a device, and the program code includes a method executed by a first accelerator or a second accelerator in any one of the implementations of the first aspect or the second aspect.

According to an eighth aspect, a computer program product including instructions is provided. When the computer program product is run on a computer, the computer is enabled to perform a method performed by a first accelerator or a second accelerator in any one of the implementations of the first aspect or the second aspect.

According to a ninth aspect, a chip is provided. The chip includes a processor and a data interface. The processor reads, through the data interface, instructions stored in a memory, to perform a method performed by a first accelerator or a second accelerator in any one of the implementations of the first aspect or the second aspect.

Optionally, in an implementation, the chip may further include a memory. The memory stores instructions, and the processor is configured to execute the instructions stored in the memory. When the instructions are executed, the processor is configured to perform a method performed by a first accelerator or a second accelerator in any one of the implementations of the first aspect or the second aspect.

The chip may be specifically a field programmable gate array (FPGA) or an application-specific integrated circuit (ASIC).

DESCRIPTION OF EMBODIMENTS

The following describes the technical solutions in embodiments of this application with reference to the accompanying drawings in embodiments of this application.

Figure 1:
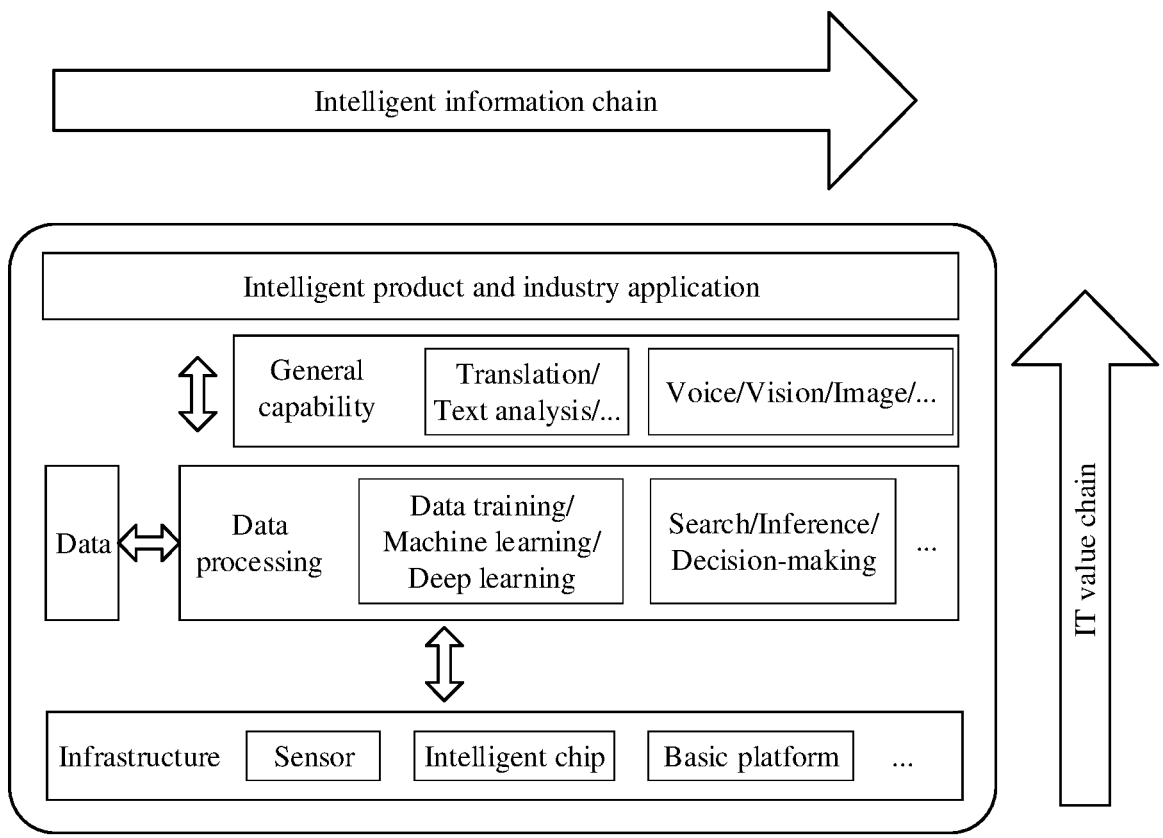
FIG. 1 is an example schematic diagram of an artificial intelligence main framework according to an embodiment of this application.

FIG. 1 is a schematic diagram of an artificial intelligence main framework. The main framework describes an overall working procedure of an artificial intelligence system, and is applicable to a requirement of a general artificial intelligence field.

The following describes in detail the artificial intelligence main framework from two dimensions: an "intelligent information chain" (e.g., horizontal axis) and an "information technology (IT) value chain" (e.g., vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence".

The "IT value chain", from the underlying artificial intelligence infrastructure and information (provision and processing of technical realizations) to the system's industry ecosystem, reflects the value that artificial intelligence contributes to the information technology industry.

(1) Infrastructure

The infrastructure provides computing capability support for the artificial intelligence system, implements communication with the external world, and implements support by using a basic platform.

The infrastructure may communicate with an outside by using a sensor, and a computation capability of the infrastructure can be provided by a smart chip.

The smart chip herein may be a hardware acceleration chip such as a central processing unit (CPU), a neural-network processing unit (NPU), a graphics processing unit (GPU), an application-specific integrated circuit (ASIC), or a field programmable gate array (FPGA).

The basic platform of the infrastructure may include related platforms, for example, a distributed computing framework and a network, for assurance and support, including cloud storage and computing, an interconnection network, and the like.

For example, the infrastructure may communicate with the outside by using the sensor, to obtain data, and the data is provided to a smart chip in a distributed computing system provided by the basic platform for computing.

(2) Data

Data at an upper layer of the infrastructure indicates a data source in the artificial intelligence field. The data relates to a graph, an image, voice, and text, further relates to Internet of things data of a conventional device, and includes service data of an existing system and perception data such as force, displacement, a liquid level, a temperature, and humidity.

(3) Data Processing

The data processing usually includes a processing manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formal information based on an inference control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result, for example, an algorithm or a general system such as translation, text analysis, computer vision processing, speech recognition, and image recognition.

(5) Smart Product and Industry Application

The smart product and the industry application are a product and an application of the artificial intelligence system in various fields, and are package of an overall solution of the artificial intelligence, so that decision-making for intelligent information is productized and an application is implemented. Application fields mainly include smart manufacturing, smart transportation, smart home, smart health care, smart security protection, autonomous driving, a safe city, a smart terminal, and the like.

Embodiments of this application may be applied to many fields of artificial intelligence, for example, fields such as smart manufacturing, smart transportation, smart home, smart health care, smart security protection, autonomous driving, and a safe city.

Specifically, embodiments of this application may be applied to fields in which a (deep) neural network needs to be used, for example, autonomous driving, image classification, image retrieval, image semantic segmentation, image quality enhancement, image super-resolution processing, and natural language processing.

The following briefly describes two application scenarios: album image classification and a safe city.

Album Image Classification:

When a user stores a large quantity of images on a terminal device (for example, a mobile phone) or a cloud disk, recognition of images in an album may help the user or a system perform classification management on the album. This improves user experience.

According to a neural network model training method in embodiments of this application, a neural network applicable to album classification can be obtained or optimized. Then, a neural network model may be used to classify images, to label different categories of images, so that the user performs viewing and searching. In addition, classification labels of the images may also be provided for an album management system for classification management. This saves management time of the user, improves album management efficiency, and improves user experience.

Attribute Recognition in a Safe City Scenario:

In the safe city scenario, a plurality of types of attribute recognition need to be performed, for example, pedestrian attribute recognition and riding attribute recognition. The deep neural network plays an important role in the plurality of types of attribute recognition by using a powerful capability of the deep neural network. According to the neural network model training method in embodiments of this application, a neural network model applicable to attribute recognition in the safe city scenario can be obtained or optimized. Then, an input road image may be processed by using the neural network model, to identify different attribute information in the road image.

Because embodiments of this application relate to massive applications of a neural network, for ease of understanding, the following describes terms and concepts related to the neural network that may be used in embodiments of this application.

(1) Neural Network

The neural network may include a neural unit. The neural unit may be an operation unit for which $x_s$ and an intercept of 1 are used as an input. An output of the operation unit may be as follows:

$$h_{W,b}(x)=f(W^T x)=f(\Sigma_{s=1}^{n} W_s x_s+b) \tag{1-1}$$

Herein, $s=1, 2, \ldots,$ or $n$, $n$ is a natural number greater than 1, $W_s$ is a weight of $x_s$, b is a bias of the neural unit, and f is an activation function (activation function) of the neural unit, and is used to introduce a nonlinear feature into the neural network, to convert an input signal in the neural unit into an output signal. The output signal of the activation function may be used as an input of a next convolutional layer, and the activation function may be a sigmoid function. The neural network is a network formed by connecting a plurality of single neural units together. To be specific, an output of one neural unit may be an input to another neural unit. An input of each neural unit may be connected to a local receptive field of a previous layer to extract a feature of the local receptive field. The local receptive field may be a region including several neural units.

(2) Deep Neural Network

The deep neural network (DNN), also referred to as a multi-layer neural network, may be understood as a neural network having a plurality of hidden layers. The DNN is divided based on locations of different layers, so that the neural network in the DNN may be classified into three types: an input layer, a hidden layer, and an output layer. Usually, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer.

Although the DNN seems to be complex, the DNN is actually not complex in terms of work at each layer, and is simply expressed as the following linear relationship expression: $\vec{y}=\alpha(W\vec{x}+\vec{b})$ Herein, $\vec{x}$ is an input vector, $\vec{y}$ is an output vector, $\vec{b}$ is an offset vector, W is a weight matrix (also referred to as a coefficient), and $\alpha(\ )$ is an activation function. At each layer, such a simple operation is performed on the input vector $\vec{x}$, to obtain the output vector $\vec{y}$. Because the DNN has a large quantity of layers, there are also a large quantity of coefficients W and a large quantity of offset vectors $\vec{b}$. These parameters are defined in the DNN as follows: The coefficient W is used as an example. It is assumed that in a three-layer DNN, a linear coefficient from a $4^{th}$ neuron at a $2^{nd}$ layer to a $2^{nd}$ neuron at a $3^{rd}$ layer is defined as $W_{24}^{3}$. A superscript 3 represents a layer number of a layer corresponding to the coefficient W, and a subscript corresponds to an index 2 of the output third layer and an index 4 of the input second layer.

In conclusion, a coefficient from a $k^{th}$ neuron at an $(L-1)^{th}$ layer to a $j^{th}$ neuron at a $L^{th}$ layer is defined as $W_{jk}^{L}$.

It should be noted that there is not parameter W for the input layer. In the deep neural network, more hidden layers make the network more capable of describing a complex case in the real world. Theoretically, a model with more parameters has higher complexity and a larger "capacity", and can be used to complete a more complex learning task. Training the deep neural network is a process of learning a weight matrix, and a final objective is to obtain a weight matrix of all layers of a trained deep neural network (a weight matrix including vectors W of a plurality of layers).

(3) Convolutional Neural Network

The convolutional neural network (CNN) is a deep neural network with a convolutional structure. The convolutional neural network includes a feature extractor that includes a convolutional layer and a sampling sublayer, and the feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neural units that are in a rectangular arrangement. Neural units in a same feature plane share a weight, and the weight shared herein is a convolution kernel. Weight sharing may be understood as that an image information extraction manner is irrelevant to a location. The convolution kernel may be in a form of a matrix of a random size. In a training process of the convolutional neural network, a proper weight may be obtained for the convolution kernel through learning. In addition, benefits directly brought by weight sharing are that connections among layers of the convolutional neural network are reduced, and an overfitting risk is reduced.

(4) Loss Function

In a process of training a deep neural network, because it is expected that an output of the deep neural network is as close as possible to a value that actually needs to be predicted, a current predicted value of the network and an actually expected target value may be compared, and then a weight vector of each layer of the neural network is updated based on a difference between the current predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the actually expected target value or a value that more approximates the actually expected target value. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (e.g., loss) of the loss function indicates a larger difference. Therefore, training of the deep neural network is a process of minimizing the loss as much as possible.

(5) Back Propagation Algorithm

In a training process, a neural network may correct a value of a parameter of a neural network model by using an error back propagation (BP) algorithm, so that a reconstruction error loss of the neural network model becomes increasingly smaller. Specifically, an input signal is forward transferred until the error loss is generated in an output, and the parameter of the neural network model is updated through back propagation of information about the error loss, to converge the error loss. The back propagation algorithm is an error-loss-centered back propagation motion intended to obtain a parameter, such as a weight matrix, of an optimal neural network model.

(6) Collective Communication Logic

The collective communication logic includes a plurality of communication modes such as all-gather, reduce, all-reduce, and reduce-scatter.

All-gather indicates that when data is distributed in a plurality of processes, the data in the plurality of processes is aggregated in each process. The plurality of processes may also be understood as a plurality of devices.

In FIG. 2(a) to FIG. 2(d), a process 0 (rank 0), a process 1 (rank 1), a process 2 (rank 2), and a process 3 (rank 3) represent four different processes, that is, four different devices. $A_0$, $A_1$, $A_2$, and $A_3$ represent data stored in the rank 0, $B_0$, $B_1$, $B_2$, and $B_3$ represent data stored in the rank 1, $C_0$, $C_1$, $C_2$, and $C_3$ represent data stored in the rank 2, and $D_0$, $D_1$, $D_2$, and $D_3$ represent data stored in the rank 3.

Figure 2A:
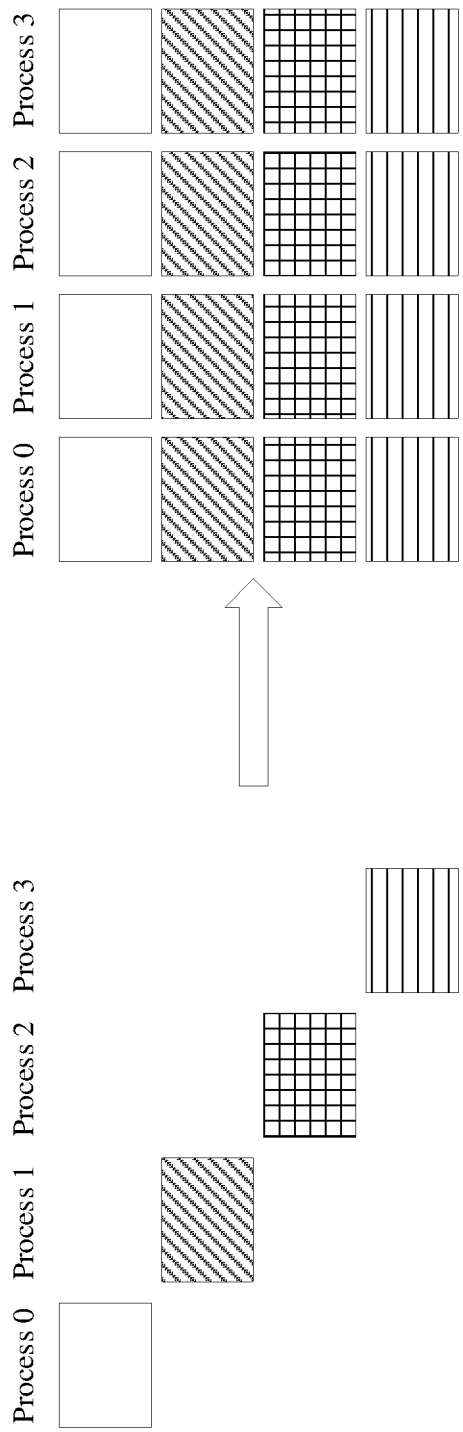
FIG. 2(a) to FIG. 2(d) are example schematic diagrams of collective communication according to an embodiment of this application.

For example, as shown in FIG. 2(a), each device stores a part of complete data, and obtains, from another device through all-gather, data that is not locally stored, so as to locally store the complete data.

Reduce is to perform an operation on data in a plurality of processes based on a specified mapping function, to store an obtained result in one process. For example, the mapping function may be a summation function, a maximum function, a minimum function, or an average function.

Figure 2B:
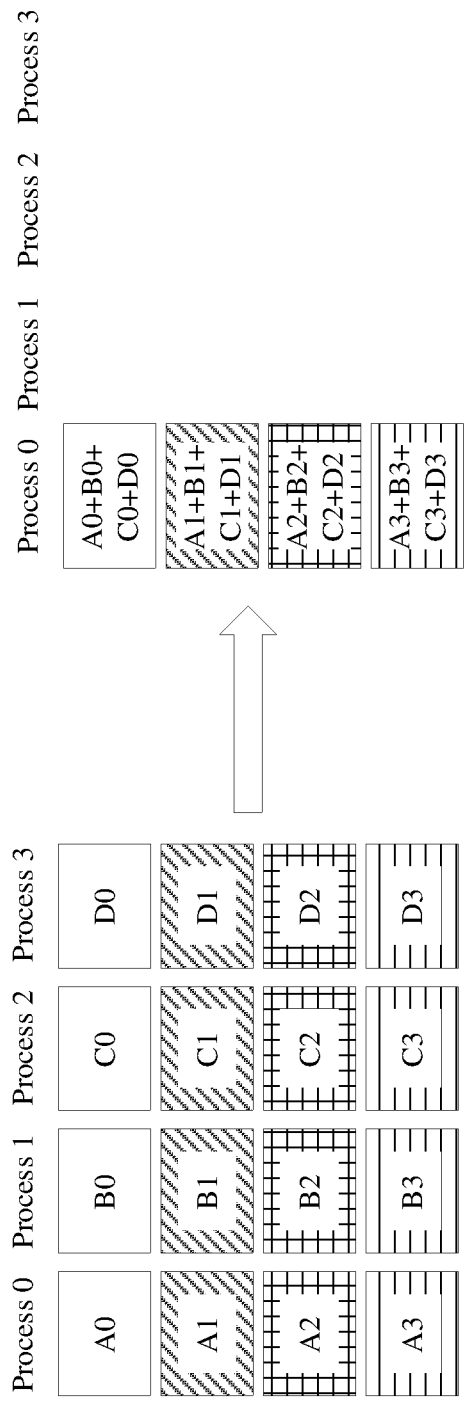

For example, as shown in FIG. 2(b), the specified mapping function is a summation function. To be specific, data in four processes is summed, and a summation result is stored in the rank 0.

All-reduce is to perform an operation on data in a plurality of processes based on a specified mapping function, to store an obtained result in the plurality of processes. In other words, each process stores a same result. For example, the mapping function may be a summation function, a maximum function, a minimum function, or an average function.

Figure 2C:
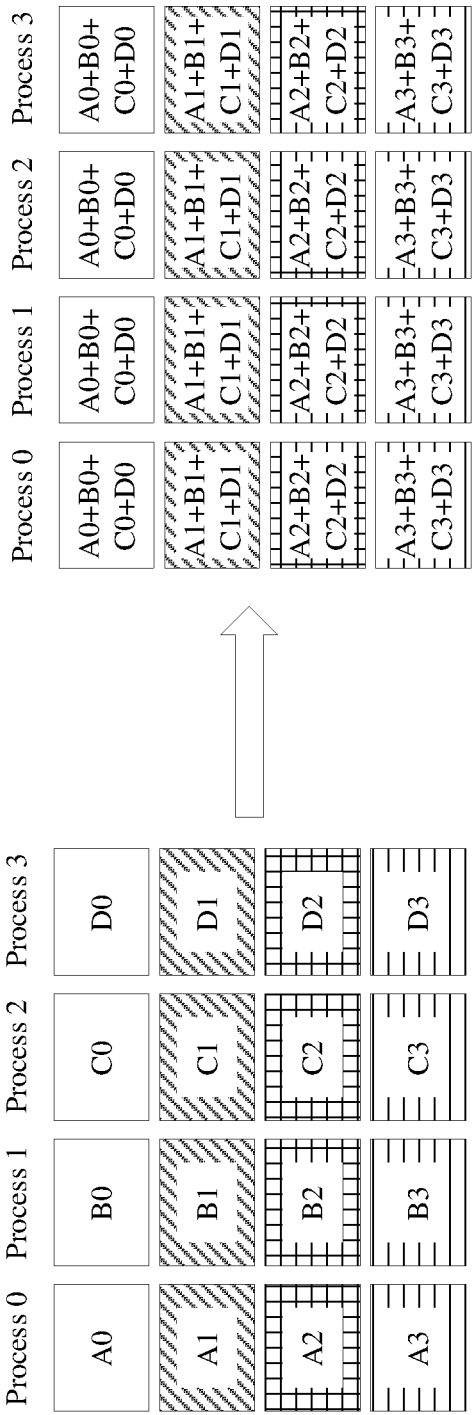

For example, as shown in FIG. 2(c), the specified mapping function is a summation function. Data in four processes is summed, and a summation result is stored in each process.

Reduce-scatter is to perform an operation on data in a plurality of processes based on a specified mapping function, to respectively store different parts of an obtained result in different processes. In other words, each process stores a part of the operation result. If a quantity of processes is N, in other words, a quantity of devices that perform collective communication is N, an amount of data stored in each process is 1/N of an amount of data corresponding to the operation result. For example, the mapping function may be a summation function, a maximum function, a minimum function, or an average function.

Figure 2D:
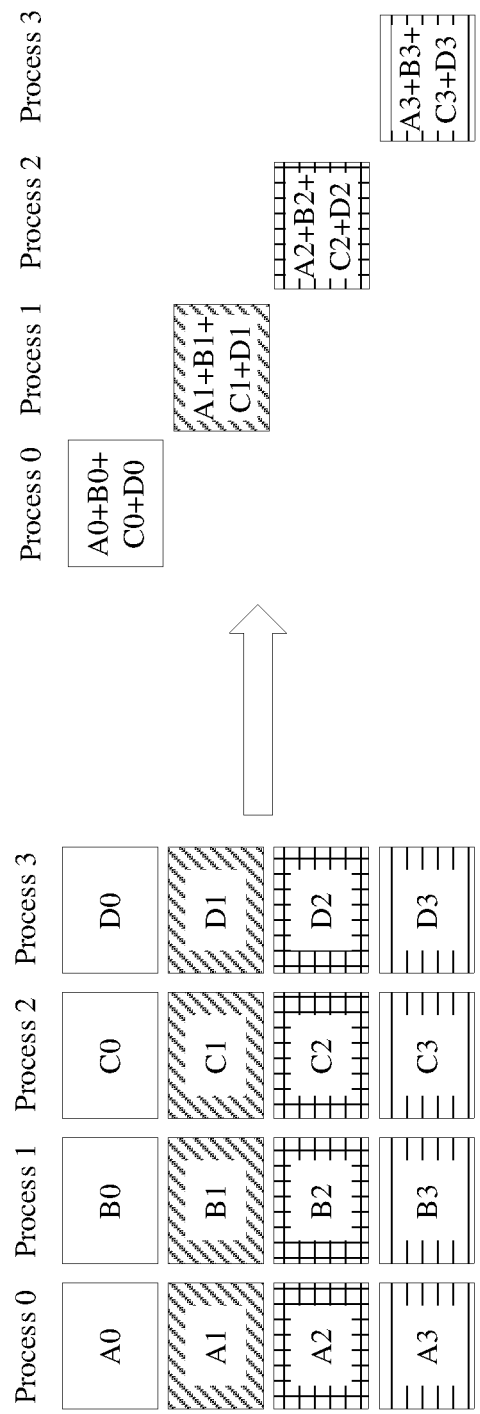

For example, as shown in FIG. 2(d), the specified mapping function is a summation function. Data in four processes is summed, a summation result is divided into four parts based on data for which the four processes are respectively responsible, and the four parts are respectively stored in the corresponding processes.

(7) Distributed Machine Learning

During distributed machine learning, a computer cluster is used to enable a machine learning algorithm to better train a big model with excellent performance from big data.

Distributed machine learning includes a data parallel mode and a model parallel mode.

In the data parallel mode, each device stores a model parameter, and training data is divided and then allocated to each device. Each device trains a model based on the training data allocated to the device. In other words, each device completes forward computation and backward computation to obtain a parameter gradient. After the parameter gradient obtained by each device is synchronized, a parameter of the model is updated. The training data allocated to each device is usually a batch size.

In the model parallel mode, each device stores some parameters of the model, and each device is responsible for computation of different parts of a same model, to jointly complete training of the model.

Figure 3:
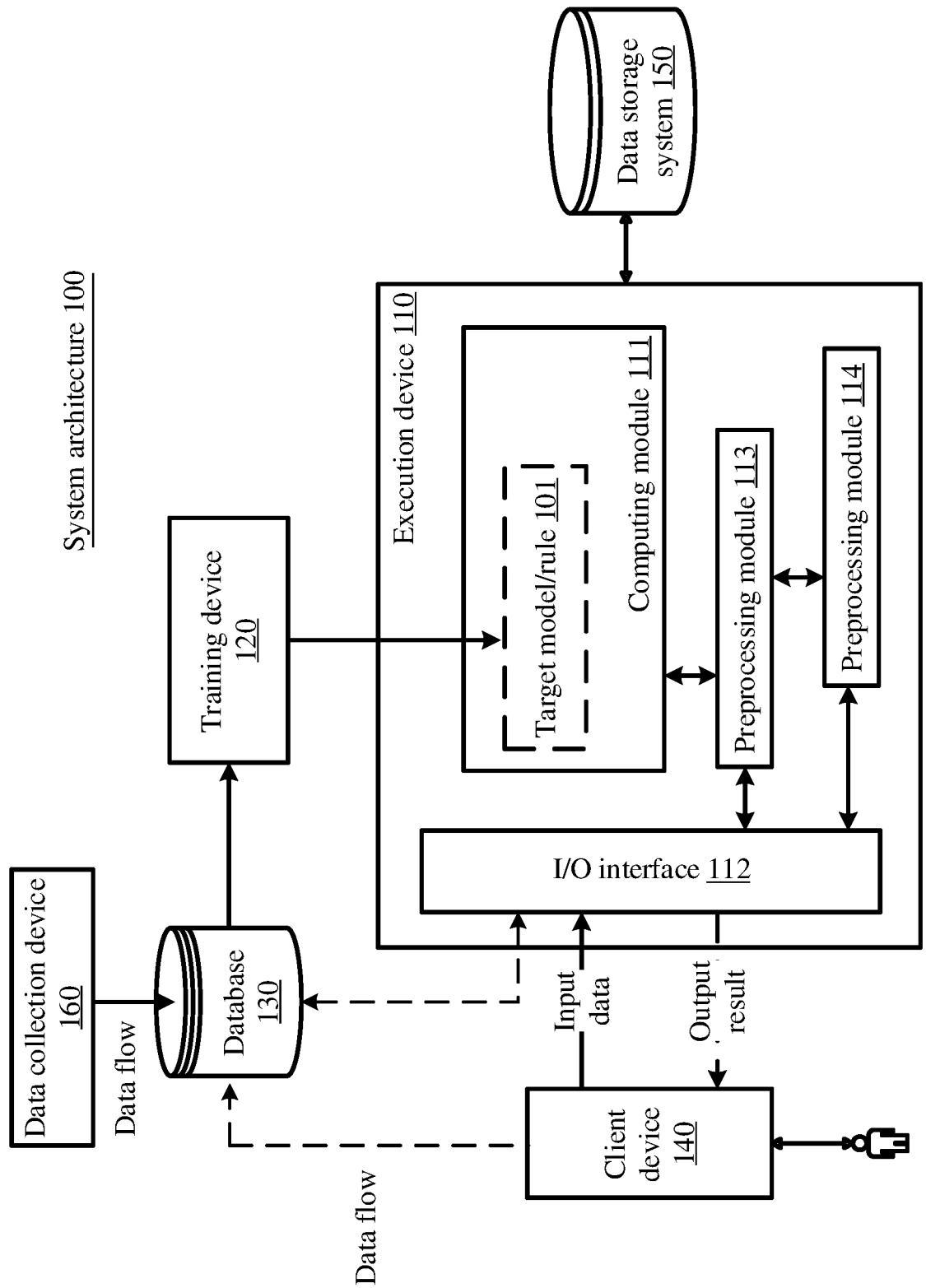
FIG. 3 is an example schematic diagram of a system architecture according to an embodiment of this application.

As shown in FIG. 3, an embodiment of this application provides a system architecture 100. In FIG. 3, a data collection device 160 is configured to collect training data. For an image processing method in embodiments of this application, the training data may include a training image and a classification result corresponding to the training image. The result of the training image may be a result of manual pre-labeling.

After collecting the training data, the data collection device 160 stores the training data in a database 130, and a training device 120 obtains a target model/rule 101 through training based on the training data maintained in the database 130.

The following describes the target model/rule 101 obtained by the training device 120 based on the training data. The training device 120 processes an input original image, and compares an output image with the original image until a difference between the image output by the training device 120 and the original image is less than a specific threshold. In this way, training of the target model/rule 101 is completed.

The target model/rule 101 can be used to implement the image processing method in embodiments of this application. The target model/rule 101 in this embodiment of this application may be specifically a neural network. It should be noted that, in an actual application, the training data maintained in the database 130 is not necessarily all collected by the data collection device 160, and may be received from another device. It should further be noted that the training device 120 may not necessarily train the target model/rule 101 completely based on the training data maintained in the database 130, or may obtain training data from a cloud or another place to perform model training. The foregoing descriptions should not be construed as a limitation on this embodiment of this application.

The target model/rule 101 obtained through training by the training device 120 may be applied to different systems or devices, for example, an execution device 110 shown in FIG. 3. The execution device 110 may be a terminal, for example, a mobile phone terminal, a tablet computer, a laptop computer, an augmented reality (AR) AR/virtual reality (VR) terminal, or a vehicle-mounted terminal; or may be a server, a cloud, or the like. In FIG. 3, an input/output (I/O) interface 112 is configured in the execution device 110, to exchange data with an external device. A user may input data to the I/O interface 112 by using a client device 140. In this embodiment of this application, the input data may include a to-be-processed image input by the client device.

A preprocessing module 113 and a preprocessing module 114 are configured to perform preprocessing based on the input data (for example, the to-be-processed image) received by the I/O interface 112. In this embodiment of this application, the preprocessing module 113 and the preprocessing module 114 may not exist (or only one of the preprocessing module 113 and the preprocessing module 114 exists). A computing module 111 is directly configured to process the input data.

In a process in which the execution device 110 preprocesses the input data, or in a process in which the computing module 111 of the execution device 110 performs related processing such as computing, the execution device 110 may invoke data, code, and the like in a data storage system 150 for corresponding processing, and may further store, in the data storage system 150, data, an instruction, and the like that are obtained through corresponding processing. The computing module 111 processes input data by using the target model/rule 101. For example, in this embodiment of this application, the computing module 111 processes the input to-be-processed image to obtain an image processing result (for example, an image classification result).

Finally, the I/O interface 112 returns a processing result such as the foregoing obtained image classification result to the client device 140, to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a required result for the user.

In a case shown in FIG. 3, the user may manually provide input data and the user may manually provide the input data in an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may alternatively be used as a data collection end, to collect, as new sample data, input data that is input to the I/O interface 112 and an output result that is output from the I/O interface 112 that are shown in the figure, and store the new sample data in the database 130. Certainly, the client device 140 may alternatively not perform collection. Instead, the I/O interface 112 directly stores, in the database 130 as new sample data, the input data input to the I/O interface 112 and the output result output from the I/O interface 112 that are shown in the figure.

It should be noted that FIG. 3 is a schematic diagram of a system architecture according to an embodiment of this application. A location relationship between a device, a component, a module, and the like shown in the figure constitutes no limitation. For example, in FIG. 3, the data storage system 150 is an external memory relative to the execution device 110. In another case, the data storage system 150 may alternatively be disposed in the execution device 110.

As shown in FIG. 3, the target model/rule 101 is obtained through training by the training device 120. The target model/rule 101 may be a neural network in this embodiment of this application. Specifically, the neural network constructed in this embodiment of this application may be a CNN, a deep convolutional neural network (DCNN), a recurrent neural network (RNNS), or the like.

Figure 4:
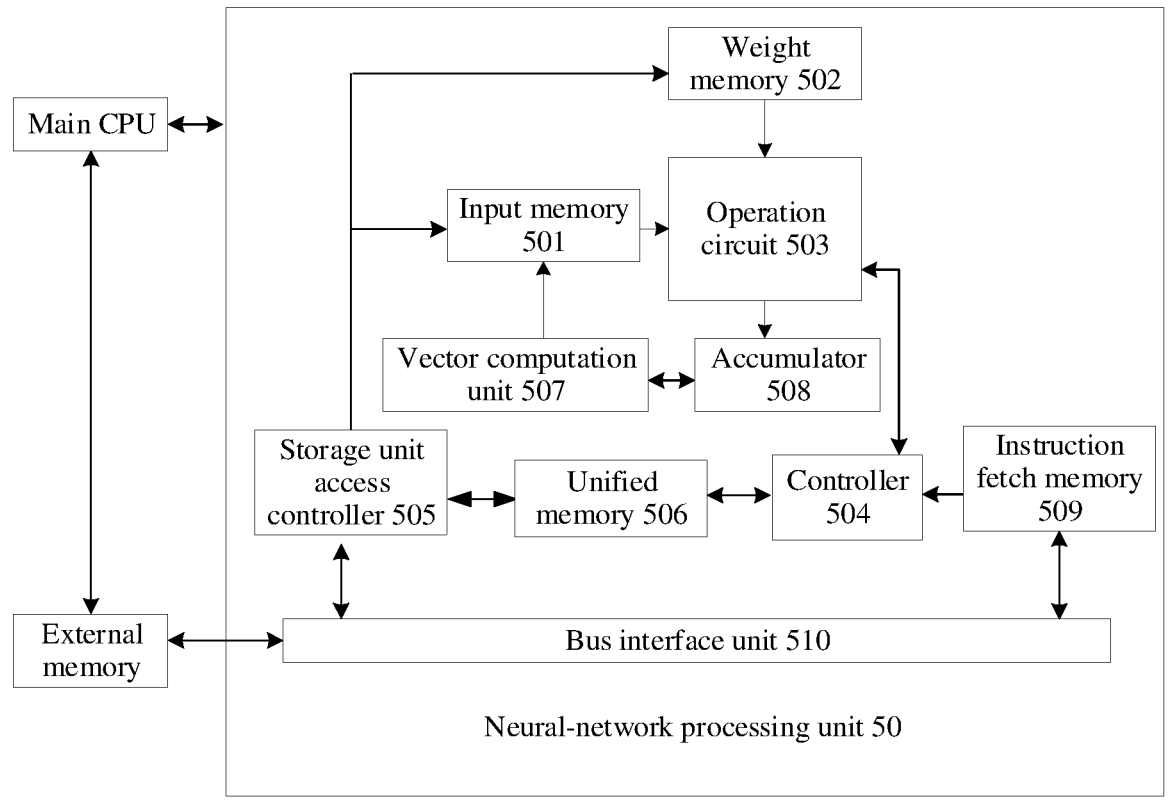
FIG. 4 is an example schematic diagram of a hardware structure of a chip according to an embodiment of this application.

FIG. 4 shows a hardware structure of a chip according to an embodiment of this application. The chip includes a neural-network processing unit 50.

The chip may be disposed in the execution device 110 shown in FIG. 3, to complete computing work of the computing module 111. The chip may alternatively be disposed in the training device 120 shown in FIG. 3, to complete training work of the training device 120 and output a target model/rule 101. Algorithms at all layers in a neural network may be implemented in the chip shown in FIG. 4.

The neural-network processing unit NPU 50 serves as a coprocessor, and may be disposed on a host central processing unit (host CPU). The host CPU assigns a task. A core part of the NPU is an operation circuit 503, and a controller 504 controls the operation circuit 503 to extract data in a memory (a weight memory or an input memory) and perform an operation.

In some implementations, the operation circuit 503 includes a plurality of processing units (process engine, PE). In some implementations, the operation circuit 503 is a two-dimensional systolic array. The operation circuit 503 may alternatively be a one-dimensional systolic array or another electronic circuit that can perform mathematical operations such as multiplication and addition. In some implementations, the operation circuit 503 is a general-purpose matrix processor.

For example, it is assumed that there is an input matrix A, a weight matrix B, and an output matrix C. The operation circuit fetches, from a weight memory 502, data corresponding to the matrix B, and caches the data on each PE in the operation circuit. The operation circuit fetches data of the matrix A from an input memory 501, to perform a matrix operation on the matrix B, and stores an obtained partial result or an obtained final result of the matrix in an accumulator (accumulator) 508.

A vector computation unit 507 may perform further processing on an output of the operation circuit, for example, vector multiplication, vector addition, an exponential operation, a logarithmic operation, and size comparison. For example, the vector computation unit 507 may be configured to perform network computation such as pooling, batch normalization, or local response normalization at a non-convolutional/non-FC layer in the neural network.

In some implementations, the vector computation unit 507 can store a processed output vector in a unified buffer 506. For example, the vector computation unit 507 may apply a non-linear function to the output of the operation circuit 503, for example, a vector of an accumulated value, to generate an activation value. In some implementations, the vector computation unit 507 generates a normalized value, a combined value, or both a normalized value and a combined value. In some implementations, the processed output vector can be used as an activation input to the operation circuit 503, for example, to be used in a subsequent layer in the neural network.

The unified memory 506 is configured to store input data and output data.

A storage unit access controller 505 (direct memory access controller, DMAC) stores input data from an external memory in the input memory 501 and/or the unified memory 506, stores, in the weight memory 502, weight data in the external memory, and stores, in the external memory, the data in the unified memory 506.

A bus interface unit (BIU) 510 is configured to implement interaction between the host CPU, the DMAC, and an instruction fetch buffer 509 by using a bus.

The instruction fetch buffer 509 connected to the controller 504, configured to store an instruction used by the controller 504.

The controller 504 is configured to invoke the instructions buffered in the instruction fetch buffer 509, to control a working process of the operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM), a high bandwidth memory (HBM), or another readable and writable memory.

An operation at each layer of the neural network in this embodiment of this application may be performed by the operation circuit 503 or the vector computation unit 507.

The neural network model training method in this embodiment of this application may be jointly completed by a plurality of accelerators. A device that can perform an operation at each layer in a neural network model may be referred to as an accelerator. For example, the accelerator may be the NPU 50 shown in FIG. 4, or the accelerator may be a CPU, or the accelerator may include a CPU and an NPU.

Figure 5:
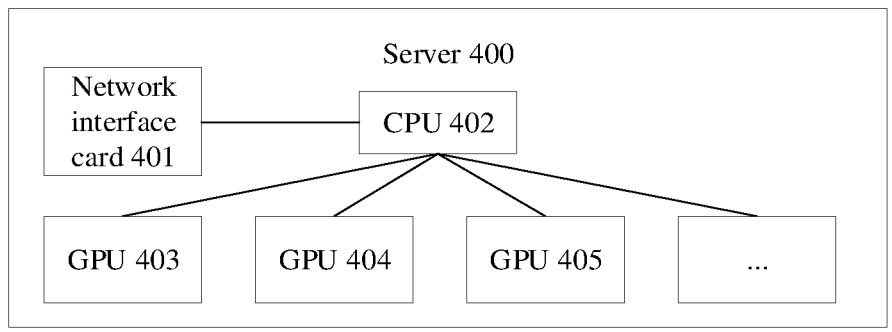
FIG. 5 is an example schematic diagram of a structure of a server according to an embodiment of this application.

As shown in FIG. 5, an embodiment of this application provides a server 400. The server 400 may be used as the execution device 110 shown in FIG. 3, to complete computing work of the computing module 111. The server 400 may alternatively be used as the training device 120 shown in FIG. 3, to complete training work of the training device 120 and output a target model/rule 101.

The server 400 includes a network interface card 401, a CPU 402, and a plurality of GPUs. As shown in FIG. 5, an accelerator may include a GPU 403, a GPU 404, a GPU 405, or the like. In the server shown in FIG. 5, the GPU is configured to perform an operation at each layer in a neural network model. In FIG. 5, the GPU may also be understood as an accelerator. It should be understood that, in FIG. 5, that the GPU is used as an accelerator is only used as an example. In an actual application, the accelerator may alternatively be another device such as a CPU, an NPU, or a TPU that can perform the operation at each layer in the neural network model. For example, the accelerator may be the NPU 50 shown in FIG. 4. This is not limited in this embodiment of this application.

It should be understood that a quantity of devices in FIG. 5 is merely an example, and the server 400 may include more or fewer CPUs, network interface cards, and GPUs than those shown in FIG. 5.

Specifically, the CPU determines a computation graph and a training sample that need to be computed by the GPU, and delivers the computation graph and the training sample to the GPU. The GPU performs computation based on the computation graph and the corresponding training sample, and feeds back a computation result to the CPU.

For example, a neural network model training method and a communication procedure that are currently performed by the CPU and the GPU may be optimized by using software, to implement a neural network model training method in embodiments of this application. For example, software is installed on the CPU, and the software generates and delivers the computation graph and the training sample that need to be computed by the GPU. In other words, this embodiment of this application may be implemented by using software based on existing hardware. Specifically, the software is run on the CPU in the server, and the CPU controls the GPU in the server to perform the neural network model training method in embodiments of this application.

Figure 6:
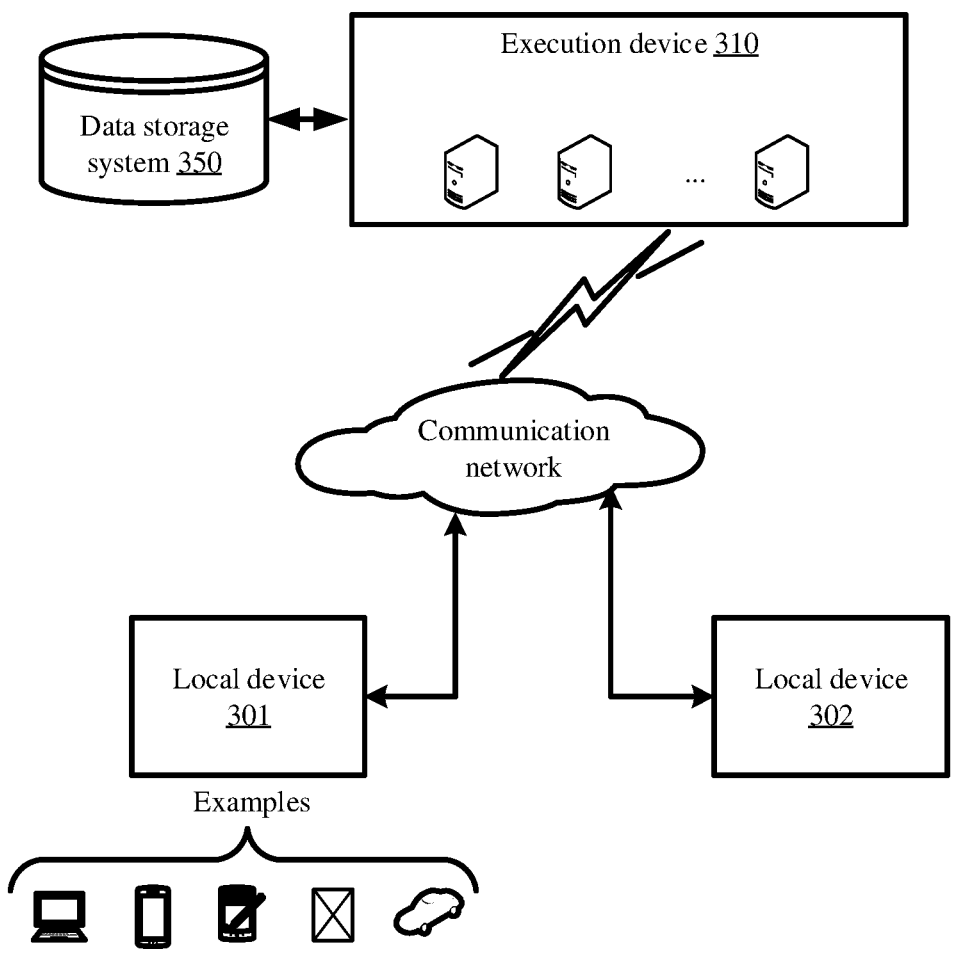
FIG. 6 is an example schematic diagram of a system architecture according to an embodiment of this application.

As shown in FIG. 6, an embodiment of this application provides a system architecture 300. The system architecture includes a local device 301, a local device 302, an execution device 310, and a data storage system 350. The local device 301 and the local device 302 are connected to the execution device 310 through a communication network.

The execution device 310 may be implemented by one or more servers. Optionally, the execution device 310 may cooperate with another computing device, for example, a device such as a data memory, a router, or a load balancer. The execution device 310 may be disposed on one physical site, or distributed on a plurality of physical sites. The execution device 310 may implement a neural network model training method in embodiments of this application by using data in the data storage system 350 or by invoking program code in the data storage system 350.

Specifically, in an implementation, the execution device 110 includes at least one first accelerator, and the at least one first accelerator may perform the following process:

Each of the at least one first accelerator obtains at least one first training sample.

Each of the at least one first accelerator performs forward computation of a neural network model on the at least one first training sample, to obtain a forward computation result. Before performing forward computation at an $i^{th}$ layer in the neural network model, the at least one first accelerator obtains different parameters of the $i^{th}$ layer locally and from another accelerator, to obtain a complete model parameter of the $i^{th}$ layer. Herein, i is a positive integer.

Each of the at least one first accelerator performs backward computation based on the forward computation result, to obtain a first parameter gradient of the neural network model.

Each of the at least one first accelerator updates a parameter of the neural network model based on the first parameter gradient of the neural network model.

The execution device 110 can obtain a trained neural network, that is, a target neural network, by using the foregoing process. The target neural network may be used for image classification, image processing, or the like.

A user may operate user equipment (for example, the local device 301 and the local device 302) of the user to interact with the execution device 310. Each local device may be any computing device, for example, a personal computer, a computer workstation, a smartphone, a tablet computer, an intelligent camera, a smart automobile, another type of cellular phone, a media consumption device, a wearable device, a set-top box, or a game console.

A local device of each user may interact with the execution device 310 through a communication network of any communication mechanism/communication standard. The communication network may be a wide area network, a local area network, a point-to-point connection, or any combination thereof.

In an implementation, the local device 301 and the local device 302 obtain a related parameter of the target neural network from the execution device 310, deploy the target neural network on the local device 301 and the local device 302, and perform image classification, image processing, or the like by using the target neural network.

In another implementation, the target neural network may be directly deployed on the execution device 310. The execution device 310 obtains a to-be-processed image from the local device 301 and the local device 302, and performs classification or another type of image processing on the to-be-processed image by using a target neural network model.

It should be noted that all functions of the execution device 310 may also be implemented by the local device. For example, the local device 301 implements the function of the execution device 310, and provides a service for a user of the local device 301, or provides a service for a user of the local device 302.

The execution device 310 may alternatively be a cloud device. In this case, the execution device 310 may be deployed on a cloud. Alternatively, the execution device 310 may be a terminal device. In this case, the execution device 310 may be deployed on a user terminal side. This is not limited in this embodiment of this application.

Figure 7:
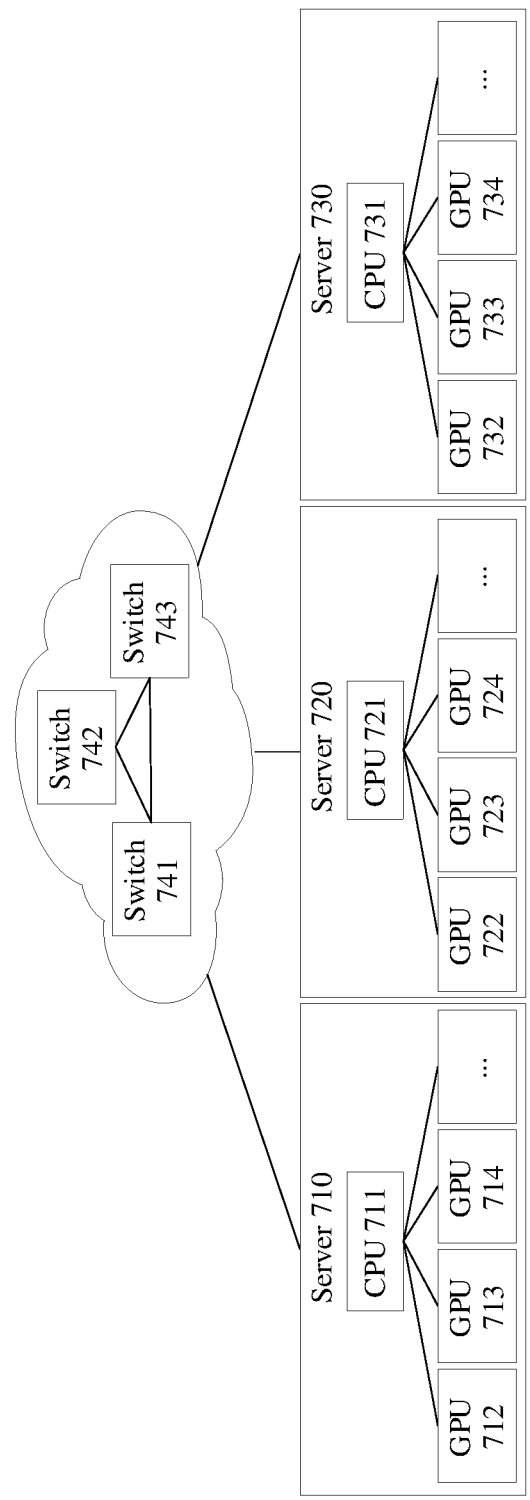
FIG. 7 is an example schematic diagram of a training system according to an embodiment of this application.

FIG. 7 is a schematic diagram of a structure of a training system 700 according to an embodiment of this application. The training system 700 may be used as the execution device 310 in FIG. 6, to complete training work of the execution device to obtain a target neural network model, or may be used as the training device 120 in FIG. 3, to complete training work of the training device 120 and output a target model/rule 101.

The training system 700 includes a server 710, a server 720, and a server 730. The servers are interconnected through a communication network.

For example, the communication network may include a switch (switch). As shown in FIG. 7, the communication network includes a switch 741, a switch 742, and a switch 743.

The server may include one or more CPUs and one or more accelerators. For example, as shown in FIG. 7, the accelerator may be a GPU. The server 710 may include a CPU 711, a GPU 712, a GPU 713, and a GPU 714. The server 720 may include a CPU 721, a GPU 722, a GPU 723, and a GPU 724. The server 730 may include a CPU 731, a GPU 732, a GPU 733, and a GPU 734.

It should be understood that a quantity of devices in FIG. 7 is merely an example, and the training system 700 may include more or fewer servers, CPUs, network interface cards, and GPUs than those shown in FIG. 7.

A memory size of a single device is limited, and there are a large quantity of model parameters in a deep model, which exerts high storage pressure to the device. A device with small memory cannot even store a complete model parameter, and it is difficult to perform a neural network model training process.

An embodiment of this application provides a neural network model training method, to reduce storage pressure of a training device.

Figure 8:
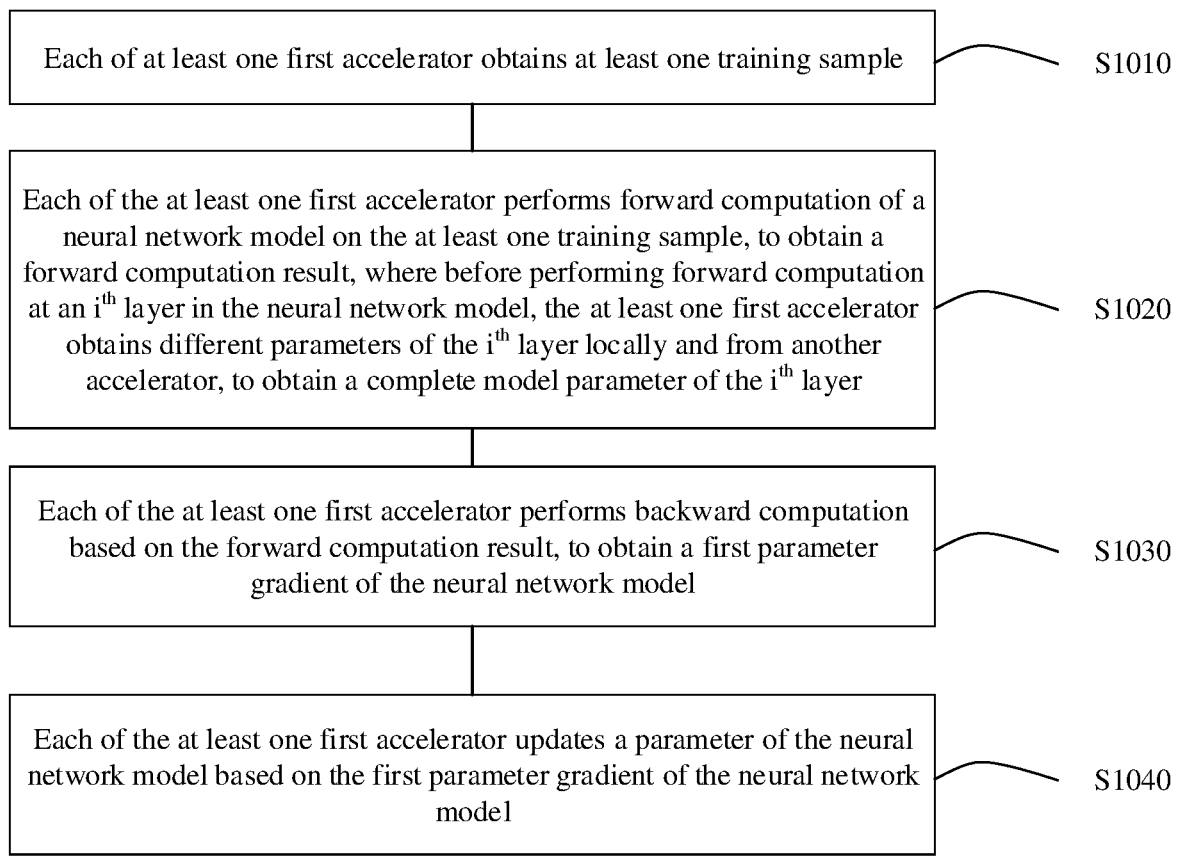
FIG. 8 is an example schematic flowchart of a neural network model training method according to an embodiment of this application.

The following describes a neural network model training method 1000 in an embodiment of this application in detail with reference to FIG. 8. The method shown in FIG. 8 may be executed by a training system of a neural network. The training system may be a cloud service device, or may be a mobile terminal, for example, an apparatus such as a computer or a server whose operation capability is sufficient to perform the method 1000. For example, the method shown in FIG. 8 may be performed by the training device 120 shown in FIG. 3, the neural-network processing unit 50 in FIG. 4, the server 400 in FIG. 5, the execution device 310 in FIG. 6, or the server 710, the server 720, or the server 730 in FIG. 7.

For example, the training system includes a plurality of devices. For example, the system may be the server 400 shown in FIG. 5. The server includes three accelerators, the three accelerators are three devices, and the three devices are configured to perform an operation at each layer in a neural network model, in other words, are configured to train the neural network model. Specifically, the three devices may be configured to perform the method 1000. For example, the accelerator may be a CPU, a GPU, an NPU, a TPU, or the like. For another example, the system may be the system shown in FIG. 7. The system includes three servers, and each server may include three devices, for example, GPUs. The nine devices are configured to perform an operation at each layer in a neural network model, in other words, are configured to train the neural network model. Specifically, the nine devices may be used as nine first accelerators to perform the method 1000.

To better describe the method 1000, the following describes a division manner and a storage manner of the neural network model in this embodiment of this application with reference to accompanying drawings.

Intra-layer segmentation is performed on the neural network model, to obtain N parameter partitions. N is a quantity of devices used for distributed storage, and the devices used for distributed storage are a plurality of devices that jointly store a complete model parameter of the neural network model. The value may be set by a user, or may be prestored. This is not limited in this embodiment of this application. N is an integer greater than 1.

The N parameter partitions are respectively stored in N accelerators. The N accelerators may be devices that can perform an operation at each layer of network in the neural network model. For example, the N accelerators each may be an NPU, a GPU, or a TPU. The N accelerators may be understood as accelerators in a shared memory group. The training system may include one shared memory group, or may include a plurality of shared memory groups. Each of the plurality of shared memory groups includes N accelerators. For example, the training system includes one shared memory group. In other words, the system includes at least N accelerators. The N accelerators may be configured to train the neural network model. For another example, if the training system includes three shared memory groups, the system includes at least 3N accelerators.

Intra-layer segmentation is to segment a parameter of at least one layer of the neural network model, to obtain N parameter partitions. Each parameter partition includes some parameters of the at least one layer. For example, parameters of a $1^{st}$ layer in the neural network model are segmented, and each parameter partition includes some parameters of the $1^{st}$ layer.

For example, if a parameter of each layer in the neural network model is segmented, each parameter partition includes some parameters of at least one layer in the neural network model. In this case, a parameter of any layer in the neural network model is stored in at least two accelerators.

Further, each parameter partition may also include some parameters of each layer in the neural network model. For example, if the neural network model includes 32 layers, each partition includes some parameters of each of the 32 layers.

Further, performing intra-layer segmentation on the neural network model may be performing intra-layer segmentation evenly on the neural network model. In other words, the N parameter partitions may include a same quantity of parameters. Each parameter partition includes I/N of the parameter of the neural network model. Each of the N accelerators stores I/N of the parameter of the neural network model. In this way, each accelerator stores a part of the neural network model, and memory (other than memory occupied by a feature) required by each accelerator for storing the neural network model is reduced to I/N of originally required memory.

Figure 9:
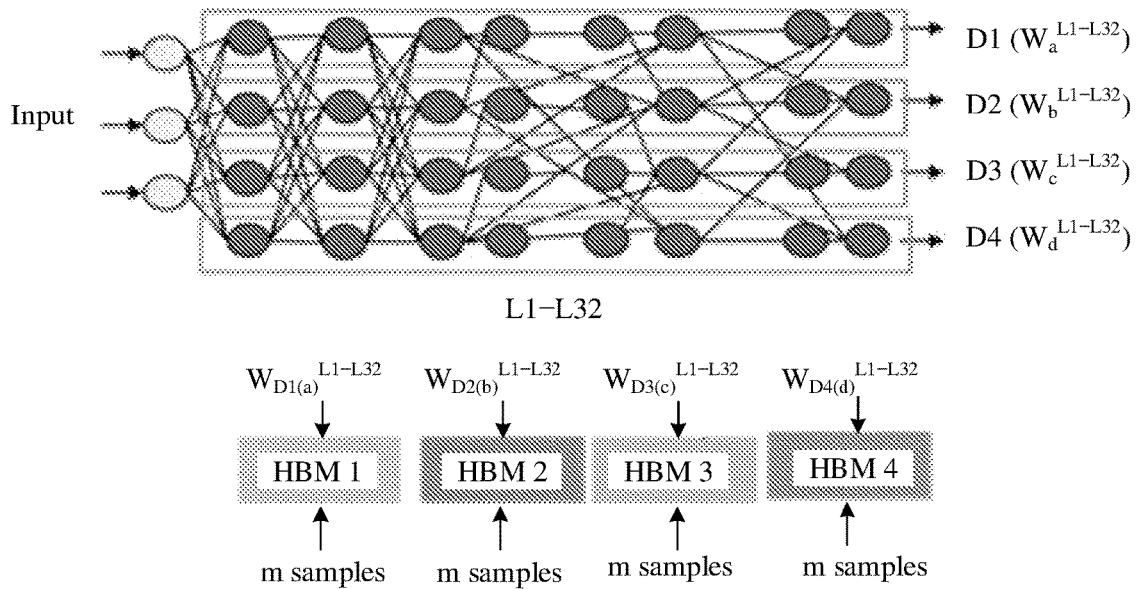
FIG. 9 is an example schematic diagram of an intra-layer segmentation result of a neural network model according to an embodiment of this application.

For example, a neural network model shown in FIG. 9 includes 32 layers of networks, that is, L1 to L32 from left to right in FIG. 9. L1 represents a $1^{st}$ layer, and L32 represents a $32^{nd}$ layer. Intra-layer segmentation is performed evenly on the neural network model, and N is 4, to obtain four parameter partitions. Each parameter partition includes a part of a parameter of each layer in the 32 layers. To be specific, the parameter of each layer is evenly segmented into four parts, a first part a of the parameter of each layer in parameters of the layer L1 to the layer L32 forms a first parameter partition $W_a^{L1-L32}$ in the four parameter partitions, a second part b of the parameter of each layer in the parameters of the layer L1 to the layer L32 forms a second parameter partition $W_b^{L1-L32}$ in the four parameter partitions, a third part c of the parameter of each layer in the parameters of the layer L1 to the layer L32 forms a third parameter partition $W_c^{L1-L32}$ in the four parameter partitions, and a fourth part d of the parameter of each layer in the parameters of the layer L1 to the layer L32 forms a fourth parameter partition $W_d^{L1-L32}$ in the four parameter partitions. Alternatively, it may be understood that the model is horizontally divided into four stripes a, b, c, and d, and a parameter in each stripe is used as a parameter partition.

It should be understood that the foregoing is merely an example, and each parameter partition may include a part of a parameter of at least one layer. The at least one layer may be 32 layers, that is, the entire neural network model, or may be less than 32 layers. In other words, a quantity of layers related to each parameter partition may be less than 32. This is not limited in this embodiment of this application.

The four parameter partitions in FIG. 9 are respectively stored in four accelerators, that is, D1, D2, D3, and D4 in FIG. 9. In this way, each accelerator stores only ¼ of the parameter, as shown in the following formula.

$$W=\{W_{D1(a)}^{L1-L32}, W_{D2(b)}^{L1-L32}, W_{D3(c)}^{L1-L32}, W_{D4(d)}^{L1-L32},\}$$

$W_{D1(a)}^{L1-L32}$ represents the first part a of the parameters of the layer L1 to the layer L32 that is stored in D1. In other words, the first part a of the parameter of each layer is stored in D1. $W_{D2(b)}^{L1-L32}$ represents the second part b of the parameters of the layer L1 to the layer L32 that is stored in D2. In other words, the second part b of the parameter of each layer is stored in D2. $W_{D3(c)}^{L1-L32}$ represents the third part c of the parameters of the layer L1 to the layer L32 that is stored in D3. In other words, the third part c of the parameter of each layer is stored in D3. $W_{D4(d)}^{L1-L32}$ represents the fourth part d of the parameters of the layer L1 to the layer L32 that is stored in D4. In other words, the fourth part d of the parameter of each layer is stored in D4.

Specifically, the N parameter partitions may be respectively stored in memories of the N accelerators.

Figure 10:
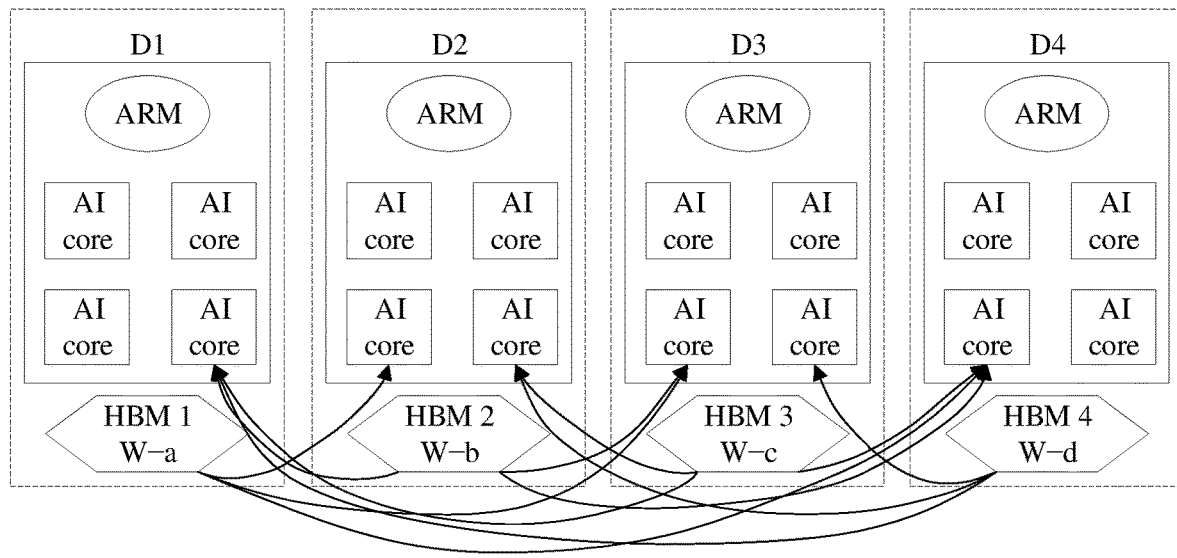
FIG. 10 is an example schematic diagram of a parameter obtaining process according to an embodiment of this application.

For example, each accelerator may include an ARM core and an artificial intelligence (AI) core, and the memory of the accelerator may include an HBM. For example, as shown in FIG. 10, each accelerator integrates one ARM core and four AI cores, and the memory of the accelerator is an HBM. The parameter partition may be stored in the HBM of the accelerator. For example, as shown in FIG. 9, the four parameter partitions are respectively stored in a memory HBM 1 of D1, a memory HBM 2 of D2, a memory HBM 3 of D3, and a memory HBM 4 of D4.

The N accelerators may be located in one server, or may be located in a plurality of servers. In this embodiment of this application, only an example in which the N accelerators are located in one server is used for description, and this does not constitute a limitation on the solution of this embodiment of this application.

In a model training process, one time of iterative training includes three phases: forward computation, backward computation, and parameter updating. The backward computation may also be referred to as back propagation. An optimizer is a functional module for implementing parameter updating. Different optimizers may update the parameter of the model in different parameter updating methods. A type of the optimizer is not limited in this embodiment of this application.

Further, a parameter gradient in a back propagation process may also be stored in a corresponding accelerator in the foregoing manner. To be specific, the parameter gradient is segmented into a plurality of parts in a parameter segmentation manner of the model, and each part is stored in an accelerator in which a corresponding parameter is located.

For example, the parameter gradient $\Delta W$ of the model is evenly segmented into four parameter gradient partitions $\Delta W_a^{L1-L32}$, $\Delta W_b^{L1-L32}$, $\Delta W_c^{L1-L32}$, and $\Delta W_d^{L1-L32}$, $\Delta W_a^{L1-L32}$ represents a first part of a parameter gradient of each layer in the layer L1 to the layer L32, $\Delta W_b^{L1-L32}$ represents a second part of the parameter gradient of each layer in the layer L1 to the layer L32, $\Delta W_c^{L1-L32}$ represents a third part of the parameter gradient of each layer in the layer L1 to the layer L32, and $\Delta W_d^{L1-L32}$ represents a fourth part of the parameter gradient of each layer in the layer L1 to the layer L32. The four parameter gradient partitions are respectively stored in D1, D2, D3, and D4, as shown in the following formula.

$$\Delta W = \{\Delta W_{D1(a)}^{L1-L32}, \Delta W_{D2(b)}^{L1-L32}, \Delta W_{D3(c)}^{L1-L32}, \Delta W_{D4(d)}^{L1-L32}\}$$

$\Delta W_{D1(a)}^{L1-L32}$ represents a first part of parameter gradients of the layer L1 to the layer L32 that is stored in D1. In other words, the first part of the parameter gradient of each layer is stored in D1. $\Delta W_{D2(b)}^{L1-L32}$ represents a second part of the parameter gradients of the layer L1 to the layer L32 that is stored in D2. In other words, the second part of the parameter gradient of each layer is stored in D2. $\Delta W_{D3(c)}^{L1-L32}$ represents a third part of the parameter gradients of the layer L1 to the layer L32 that is stored in D3. In other words, the third part of the parameter gradient of each layer is stored in D2. $\Delta W_{D4(d)}^{L1-L32}$ represents a fourth part of the parameter gradients of the layer L1 to the layer L32 that is stored in D4. In other words, the fourth part of the parameter gradient of each layer is stored in D4.

Further, a parameter, parameter momentum, and status information that are related to the optimizer in a parameter updating process may also be stored in a corresponding accelerator in the foregoing manner. To be specific, the foregoing information is segmented into a plurality of parts in the parameter segmentation manner of the model, and each part is stored in an accelerator in which a corresponding parameter is located.

Based on the division manner and storage manner of the neural network model, the accelerator in the training system may perform distributed training of the neural network model in a data parallel manner.

N accelerators in a memory sharing group are used as an example. The N accelerators each perform forward computation and backward computation based on different training samples, to obtain a parameter gradient, and then update the parameter of the model based on a parameter gradient obtained based on all or some training samples.

For example, as shown in FIG. 9, one memory sharing group includes N accelerators, m training samples are input to each of the N accelerators in each time of iteration, and the m training samples may be stored in the HBM of the accelerator. A different training sample may be input to each accelerator. If a device used to train the neural network model in the training system is the N accelerators, the N accelerators train N*m training samples in each time of iteration. To be specific, the parameter of the model may be updated based on a parameter gradient obtained based on the N*m training samples in each time of iteration, or the parameter of the model may be updated based on a parameter gradient obtained based on some of the N*m training samples in each time of iteration. In each time of iteration, the N*m training samples are all training samples. If the device used to train the neural network model in the training system further includes another accelerator different from the N accelerators, the N accelerators may further update the parameter of the model based on a parameter gradient obtained by the N accelerators and the another accelerator different from the N accelerators. In this case, all training samples further include training samples used by the another accelerator.

In the solution of this embodiment of this application, a plurality of accelerators perform distributed training of the neural network model in the data parallel manner. Each accelerator stores only some parameters of the neural network model, and required memory is far less than memory required for storing the parameter of the entire neural network model. Therefore, a large amount of memory is saved, so that each accelerator can support training performed based on more training samples, thereby improving training performance.

The following separately describes, with reference to accompanying drawings, a forward computation process, a backward computation process, and a parameter updating process of training the neural network model in the data parallel manner.

S1010: At least one first accelerator obtains at least one training sample.

The training sample may be pre-stored in the memory of the accelerator, or may be entered by the user.

For example, in a case of distributed training, the at least one accelerator includes two or more accelerators. The two or more accelerators may belong to a same shared memory group, or may belong to different shared memory groups.

For example, the at least one accelerator is N accelerators, a plurality of training samples may be grouped into N groups, and the N accelerators respectively obtain the N groups of training samples. For example, the plurality of training samples are evenly grouped into N groups, and each group of training samples includes m training samples. Each of the N accelerators obtains a group of training samples. In other words, each accelerator obtains m training samples.

For example, as shown in FIG. 9, the N groups of training samples are respectively stored in N accelerators, and each accelerator may obtain m training samples from a memory.

For example, the N accelerators may be shown in FIG. 10. In FIG. 10, N is 4, and each accelerator integrates one advanced reduced instruction set computing machines (advanced RISC machines, ARM) core and four AI cores. The training sample is stored in a memory of each of D1 to D4, for example, stored in each of the HBM 1, the HBM 2, the HBM 3, and the HBM 4 in FIG. 10. D1 to D4 each may load m training samples from a respective HBM into the AI core.

It should be understood that the accelerator shown in FIG. 10 is merely an example. A form of the accelerator is not limited in this embodiment of this application, provided that the accelerator can be used to implement training of the neural network model. For example, the N accelerators each may alternatively be the neural-network processing unit 50 shown in FIG. 4. It should be further noted that, in FIG. 9 and FIG. 10, only N devices in a same memory sharing group are used as an example, and accelerators used for distributed training in the training system may alternatively belong to different memory sharing groups.

S1020: Each of the at least one first accelerator performs forward computation of the neural network model on the at least one training sample, to obtain a forward computation result.

Before performing forward computation at an $i^{th}$ layer in the neural network model, the at least one first accelerator obtains different parameters of the $i^{th}$ layer locally and from another accelerator, to obtain a complete model parameter of the $i^{th}$ layer. Herein, i is a positive integer.

When forward computation at each layer in the neural network model is performed, a complete model parameter of the layer is required. The different parameters of the $i^{th}$ layer are separately stored in a plurality of accelerators, some parameters of the $i^{th}$ layer are stored in a first accelerator, and the other parameters are separately stored in another accelerator. Before performing forward computation at the $i^{th}$ layer, the first accelerator needs to obtain the complete model parameter of the $i^{th}$ layer locally and from the another accelerator. The another accelerator is an accelerator that belongs to a same shared memory group as the first accelerator. For example, the different parameters of the $i^{th}$ layer are separately stored in N accelerators, and the N accelerators belong to one shared memory group. Before performing forward computation at the $i^{th}$ layer, one (an example of the first accelerator) of the N accelerators needs to obtain the different parameters of the $i^{th}$ layer that are stored locally and in the other N−1 accelerators, to obtain the complete model parameter of the $i^{th}$ layer.

For example, as shown in FIG. 9, to perform forward computation at the layer L1, a complete parameter of the layer L1 is required. The parameter of the layer L1 includes four parts stored in the four accelerators, that is, a first part $W_a^{L1}$, a second part $W_b^{L1}$, a third part $W_c^{L1}$, and a fourth part $W_d^{L1}$. As shown in FIG. 9, before forward computation at the layer L1 is performed, the four parts need to be respectively obtained from the four accelerators, to obtain the complete parameter of the layer L1. As shown in FIG. 10, the HBM of D1 (an example of the first accelerator) stores one part of the parameter of the layer L1, and the other three parts are respectively stored in HBMs of D2 to D4. D1 obtains one part of the parameter of the layer L1 from the HMB 1, and respectively obtains the other three parts from the HBM 2, the HBM 3, and the HBM 4, to obtain the complete parameter of the layer L1.

All layers whose parameter needs to be obtained from another accelerator in the forward computation process of the neural network model may be understood as the $i^{th}$ layer. Before performing forward computation at any layer, if the first accelerator does not locally store a complete model parameter of the layer, the first accelerator may obtain different parameters of the layer locally and from the another accelerator, to obtain the complete model parameter of the layer.

It should be noted that the first accelerator may obtain a parameter of one or more layers each time. For example, in any parameter obtaining process before the first accelerator performs forward computation at the $i^{th}$ layer, the first accelerator may obtain only the parameter of the $i^{th}$ layer, or may obtain both a parameter of the $i^{th}$ layer and a parameter of another layer.

In other words, a granularity at which the first accelerator obtains a parameter each time may be set based on a requirement. The granularity at which the first accelerator obtains a parameter each time may be manually set, and specifically, may be set based on a hardware capability and a software requirement. For example, the granularity at which the first accelerator obtains a parameter each time is set according to storage space of the first accelerator.

A parameter obtaining granularity may be understood as a quantity of layers whose parameters are obtained. The parameter obtaining granularity may be a parameter of one layer, or may be a parameter of a plurality of layers. A larger parameter obtaining granularity indicates a larger quantity of layers whose parameters are obtained and larger required storage space.

For example, the neural network model includes 32 layers, and a first device performs forward computation in a sequence from a $1^{st}$ layer to a $32^{nd}$ layer. If intra-layer segmentation is performed at each layer in the neural network model, and obtained parts are stored in a plurality of accelerators, before performing forward computation at each layer, the first accelerator needs to obtain a complete parameter of the layer locally and from the another accelerator. If the granularity at which a parameter is obtained each time is a parameter of one layer, the first accelerator obtains a parameter of one layer each time in a sequence from the $1^{st}$ layer to the $32^{nd}$ layer. If the granularity at which a parameter is obtained each time is parameters of two layers, the first accelerator obtains parameters of the two layers each time in a sequence from the $1^{st}$ layer to the $32^{nd}$ layer. For example, the first accelerator obtains both different parameters of the $1^{st}$ layer and different parameters of a $2^{nd}$ layer locally and from the another accelerator, to obtain complete model parameters of the $1^{st}$ layer and the $2^{nd}$ layer. It should be noted that the foregoing is merely an example. In the forward computation process, the granularity at which the first accelerator obtains a parameter each time may be the same or may be different. For example, a granularity at which a parameter is obtained next may be determined based on storage space of a current first accelerator, provided that an obtained parameter includes a parameter of at least one layer. All of the at least one first accelerator may obtain a parameter at a same granularity or different granularities.

Further, for N devices belonging to a same shared memory group, the N devices may obtain a same parameter.

For example, in FIG. 10, D1 to D4 belong to a same shared parameter group, and D1 to D4 are all used to train the neural network model. In other words, the at least one accelerator includes D1 to D4. The parameter of the $i^{th}$ layer may include four parts, and the four parts are respectively stored in the four accelerators. D1 obtains a first part of the parameter from D1, and obtains the other three parts from the other three devices, to obtain the complete model parameter of the $i^{th}$ layer. D2 obtains a second part of the parameter from D2, and obtains the other three parts from the other three devices, to obtain the complete model parameter of the $i^{th}$ layer. D3 obtains a third part of the parameter from D3, and obtains the other three parts from the other three devices, to obtain the complete model parameter of the $i^{th}$ layer. D4 obtains a fourth part of the parameter from D4, and obtains the other three parts from the other three devices, to obtain the complete model parameter of the $i^{th}$ layer. For example, a parameter is stored in an HBM, and obtaining the parameter may be loading the parameter from the HBM to a cache of an AI core. In other words, the four accelerators each need to obtain parameters from four HBMs.

Obtaining a parameter segment may also be understood as loading (load) a parameter. For example, the parameter segment may be obtained in a point-to-point communication manner, a cache read/write manner, or a collective communication manner. For example, point-to-point communication may be implemented through direct memory access (DMA) engine transmission or network interface card transmission. For another example, collective communication may be implemented through DMA engine transmission or network interface card (NIC) transmission.

In the forward computation process of the neural network model, the N accelerators need to load model parameters between devices, and other data may be stored locally.

It should be noted that, in this embodiment of this application, a meaning represented by "model" is the same as a meaning represented by "neural network model".

Optionally, after performing forward computation at the $i^{th}$ layer in the neural network model, the at least one first accelerator releases a parameter that is of the $i^{th}$ layer and that is obtained from the another accelerator.

Specifically, the first accelerator performs forward computation at the $i^{th}$ layer, to obtain a first feature. The first accelerator stores the first feature, and releases the parameter that is of the $i^{th}$ layer and that is obtained from the another accelerator.

In other words, after performing forward computation at any layer, the first accelerator may store a feature output by the layer. If a parameter of the layer includes a parameter obtained from the another accelerator, the parameter that is of the layer and that is obtained from the another accelerator is released.

The first accelerator may store the first feature after completing forward computation at the $i^{th}$ layer, release the parameter that is of the $i^{th}$ layer and that is obtained from the another accelerator, and then perform forward computation at an $(i+1)^{th}$ layer. Alternatively, after completing forward computation at any layer after the $i^{th}$ layer, the first accelerator may store a feature output by the corresponding layer, and release the parameter that is of the $i^{th}$ layer and that is obtained from the another accelerator.

For example, the first accelerator may store the first feature in the HBM, and free the cache.

For example, the first accelerator separately obtains different parameters of the layer L1 and different parameters of a layer L2 locally and from the another accelerator, to obtain the complete model parameter of the layer L1 and a complete model parameter of the layer L2. The first accelerator performs forward computation at the layer L1, and outputs a feature A (an example of the first feature). The feature A is input to the layer L2. The first accelerator performs forward computation at the layer L2, and outputs a feature B (an example of the first feature). The first accelerator stores the feature A and the feature B, and releases the parameter of the layer L1 and a parameter of the layer L2. Alternatively, the first accelerator performs forward computation at the layer L1, and outputs a feature A (an example of the first feature). The first accelerator stores the feature A, and releases the parameter of the layer L1. The feature A is input to the layer L2. The first accelerator performs forward computation at the layer L2, and outputs a feature B (an example of the first feature). The first accelerator stores the feature B, and releases a parameter of the layer L2.

According to the solution in this embodiment of this application, after forward computation is completed, a parameter obtained from another accelerator is released, so that space occupied by a model parameter in the training process can be reduced. In this way, each accelerator can support more training samples, linearity of a training cluster is improved, and efficient training of the neural network model is implemented.

Each of the at least one accelerator performs forward computation based on different training samples, to obtain each forward computation result. The following describes the forward computation process by using the neural network model shown in FIG. 9 as an example, and does not constitute a limitation on the solution of this embodiment of this application.

Parameter partitions are respectively stored in the memories of D1 to D4 after being obtained through segmentation in a manner in FIG. 9, for example, stored in the HBM 1, the HBM 2, the HBM 3, and the HBM 4 in FIG. 10. W-a, W-b, W-c, and W-d respectively represent the four parameter partitions of the neural network model that are stored in the HBM 1, the HBM 2, the HBM 3, and the HBM 4. Intra-layer segmentation is performed at each layer in the neural network model in FIG. 9, to obtain four parts, and all the parts are respectively stored in the memories of D1 to D4.

As shown in FIG. 10, before performing forward computation at the layer L1, each accelerator obtains a parameter of at least one layer, and the parameter of the at least one layer includes the parameter of the layer L1. Alternatively, it may be understood that each accelerator loads a parameter on the basis of one layer or loads a parameter on the basis of a plurality of layers. In other words, to perform forward computation at the layer L1, each accelerator may load the parameter of the layer L1, that is, load the parameter on the basis of one layer, or may load parameters of a plurality of layers including the layer L1, that is, load the parameters on the basis of a plurality of layers.

With reference to FIG. 10, the following describes the forward computation process by using an example in which the accelerator loads the parameter on the basis of one layer. The four accelerators (an example of the at least one first accelerator) in FIG. 10 belong to a same shared memory group.

Step 1: The four accelerators load the parameter of the layer L1.

For example, the four accelerators may load the parameter of the layer L1 through all-gather. For example, as shown in FIG. 10, the four accelerators each load the first part $W_a^{L1}$ of the parameter of the layer L1 from the HBM 1, load the second part $W_b^{L1}$ of the parameter of the layer L1 from the HBM 2, load the third part $W_c^{L1}$ of the parameter of the layer L1 from the HBM 3, and load the fourth part of the parameter of the layer L1 from the HBM 4, to obtain the parameter of the layer L1. Specifically, each accelerator loads a parameter to a cache of an AI core of the accelerator. In this way, the cache of the AI core of each accelerator stores the complete parameter of the layer L1.

Step 2: The four accelerators each perform forward computation at the layer L1 in parallel based on a local training sample, to obtain a feature (an example of the first feature) output by the layer L1, and store the feature in a local HBM.

Further, each accelerator may free the cache of the AI core after forward computation at the layer L1 is completed.

Step 3: Sequentially perform forward computation at the layer L2 to the layer L32.

Forward computation at the layer L2 to the layer L32 is sequentially performed based on a forward computation process at the layer L1, until forward computation at each layer is completed.

With reference to FIG. 10, the following describes the forward computation process by using an example in which the accelerator loads the parameter on the basis of a plurality of layer.

Step 1: The four accelerators load the parameter of the layer L1 and the parameter of the layer L2.

For example, each accelerator may load the parameter of the layer L1 and the parameter of the layer L2 through all-gather. For example, each accelerator separately loads the first part $W_a^{L1}$ of the parameter of the layer L1 and a first part $W_a^{L2}$ of the parameter of the layer L2 from the HBM 1, loads the second part $W_b^{L1}$ of the parameter of the layer L1 and a second part $W_b^{L2}$ of the parameter of the layer L2 from the HBM 2, loads the third part $W_c^{L1}$ of the parameter of the layer L1 and a third part $W_c^{L2}$ of the parameter of the layer L2 from the HBM 3, and loads the fourth part $W_d^{L1}$ of the parameter of the layer L1 and a fourth part $W_d^{L2}$ of the parameter of the layer L2 from the HBM 4. Specifically, each accelerator loads a parameter to a cache of an AI core of the accelerator. In this way, the cache of the AI core of each accelerator stores the complete parameter of the layer L1 and a complete parameter of the layer L2.

Step 2: The four accelerators each perform forward computation at the layer L1 and the layer L2 in parallel based on a local training sample, to obtain features (an example of the first feature) output by the layer L1 and the layer L2, and store the features in a local HBM. Further, the cache of the AI core may be freed after forward computation at the layer L2 is completed.

Step 3: Sequentially perform forward computation at the layer L3 to the layer L32.

Forward computation at the layer L3 to the layer L32 is sequentially performed based on a forward computation process at the layer L1 and the layer L2, until forward computation at each layer is completed.

It should be understood that a parameter needs to be loaded for a plurality of times in the entire forward computation process. The foregoing provides descriptions by using an example in which a parameter is loaded at a same granularity each time. In a specific implementation process, a granularity at which a parameter is loaded each time may be different. For example, the parameter is loaded on the basis of one layer at a first time, and the parameter is loaded on the basis of two layers at a second time. The granularity at which a parameter is loaded is not limited in this embodiment of this application. In a specific implementation process, the granularity at which a parameter is loaded may alternatively be selected based on a hardware capability and a software requirement.

Optionally, obtaining a parameter and forward computation may be performed in serial, or may be performed in an overlapping (overlap) manner.

That obtaining a parameter and forward computation are performed in serial means that, after forward computation at one or more layers is completed, a parameter of a layer after the one or more layers is obtained.

Figure 11:
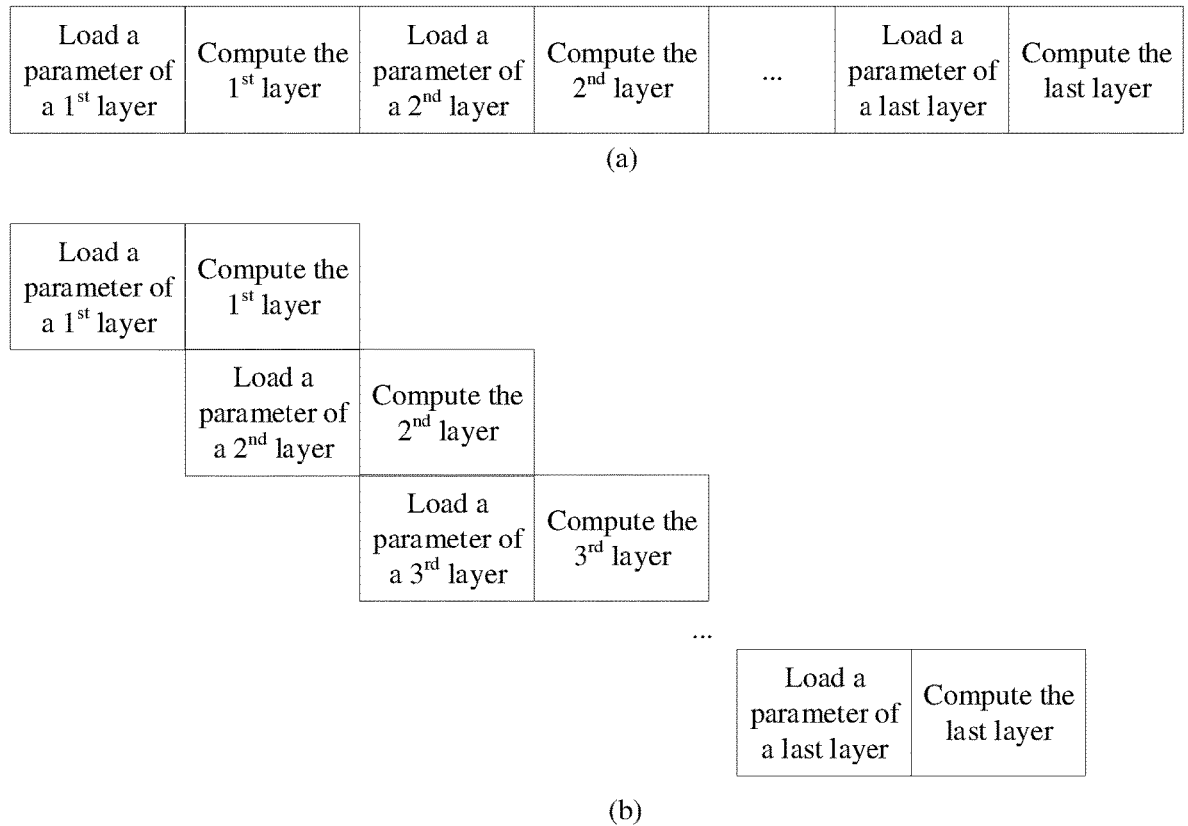
FIG. 11 is an example schematic flowchart of a parameter obtaining process and a computation process according to an embodiment of this application.

For example, as shown in (a) in FIG. 11, each accelerator loads a parameter of one layer each time, and then performs forward computation at the layer. After forward computation at the layer is completed, a parameter of a next layer is loaded, and then forward computation at the next layer is performed, until forward computation of the entire model is completed.

That obtaining a parameter and forward computation are performed in the overlapping manner means that, in a time period in which forward computation at one or more layers is performed, a parameter of a layer after the one or more layers is obtained.

Alternatively, it may be understood that, in a time period in which the at least one first accelerator performs forward computation at any one or more layers before the $i^{th}$ layer in the neural network model, the at least one first accelerator obtains the different parameters of the $i^{th}$ layer locally and from the another accelerator, to obtain the complete model parameter of the $i^{th}$ layer.

It should be noted that, obtaining a parameter of another layer in a time period of forward computation at a current layer may be understood as performing an operation of obtaining the parameter of the another layer in the time period of forward computation at the current layer. It is not specified that a time period in which the parameter of the another layer is obtained completely falls within the time period of forward computation at the current layer.

For example, as shown in (b) in FIG. 11, each device loads a parameter of one layer each time, and then performs forward computation at the layer. In a time period in which forward computation at the layer is performed, a parameter of a next layer is loaded, and then forward computation at the next layer is performed, until forward computation of the entire model is completed.

Obtaining a parameter and forward computation are overlapped, to reduce a communication time period that cannot be hidden in a computation process, improve training efficiency, and improve training performance of a cluster.

S1030: Each of the at least one first accelerator performs backward computation based on the forward computation result, to obtain a first parameter gradient of the neural network model.

S1040: Each of the at least one first accelerator updates the parameter of the neural network model based on the first parameter gradient of the neural network model.

Step S1010 to step S1040 may be considered as one iteration process, and the at least one first accelerator may repeat the iteration process, until a trained neural network model is obtained.

It should be noted that a layer that is in the neural network model and on which no segmentation is performed, namely, a layer whose complete model parameter is stored in the first accelerator, may be trained in an existing manner.

According to the solution in this embodiment of this application, different parts of the parameter of the neural network model may be stored in a plurality of accelerators, and the first accelerator may obtain a required parameter from another device, and complete forward computation of the neural network model. In this way, storage pressure of the first accelerator can be reduced without affecting training the neural network model by the first accelerator.

In addition, the at least one first accelerator can implement data parallel model training, to improve model training efficiency.

When a computing capability and a memory size of a single device cannot satisfy training of a neural network, the neural network model may be trained in a distributed parallel training manner. Distributed parallel training includes a data parallel training manner and a model parallel training manner. In the data parallel training manner, each device trains the complete neural network model based on some training samples. Each device needs to store information such as a complete model parameter and a model parameter gradient, and further needs to store a large amount of feature value information generated based on some training samples in the computation process. A larger model indicates larger memory occupied by information such as a model parameter and a model parameter gradient. In this case, each device may support a smaller quantity of training samples. In other words, when the model occupies large memory, each device can train the neural network model based on only a small quantity of training samples. Consequently, linearity of a training cluster becomes worse, and effective performance of the cluster decreases. When the model is extremely large, especially when the single device cannot store the complete model parameter, training may be performed in the model parallel manner. In the model parallel training manner, each device trains a part of the neural network model based on all training samples. In this way, high communication costs are introduced to the training cluster, and the effective performance of the cluster is reduced.

This embodiment of this application further provides a neural network model training method, to implement efficient training of the neural network model.

In step S1020, a parameter obtained from another device may be released after forward computation is completed, so that storage space occupied by the parameter in the training process is reduced.

Further, during backward computation, a required parameter is obtained again with reference to a parameter obtaining manner in the forward computation process, to perform backward computation.

The following describes the backward computation process, that is, step S1030.

Optionally, in step S1030, before performing backward computation at a $j^{th}$ layer in the neural network model, the at least one first accelerator obtains different parameters of the $j^{th}$ layer locally and from another first accelerator, to obtain a complete model parameter of the $j^{th}$ layer. Herein, j is a positive integer.

When backward computation at each layer in the neural network model is performed, a complete model parameter of the layer is required. The different parameters of the $j^{th}$ layer are separately stored in a plurality of accelerators, some parameters of the $j^{th}$ layer are stored in a first accelerator, and the other parameters are separately stored in another accelerator. Before performing backward computation at the $j^{th}$ layer, the first accelerator needs to obtain the complete model parameter of the $j^{th}$ layer locally and from the another accelerator.

Figure 12:
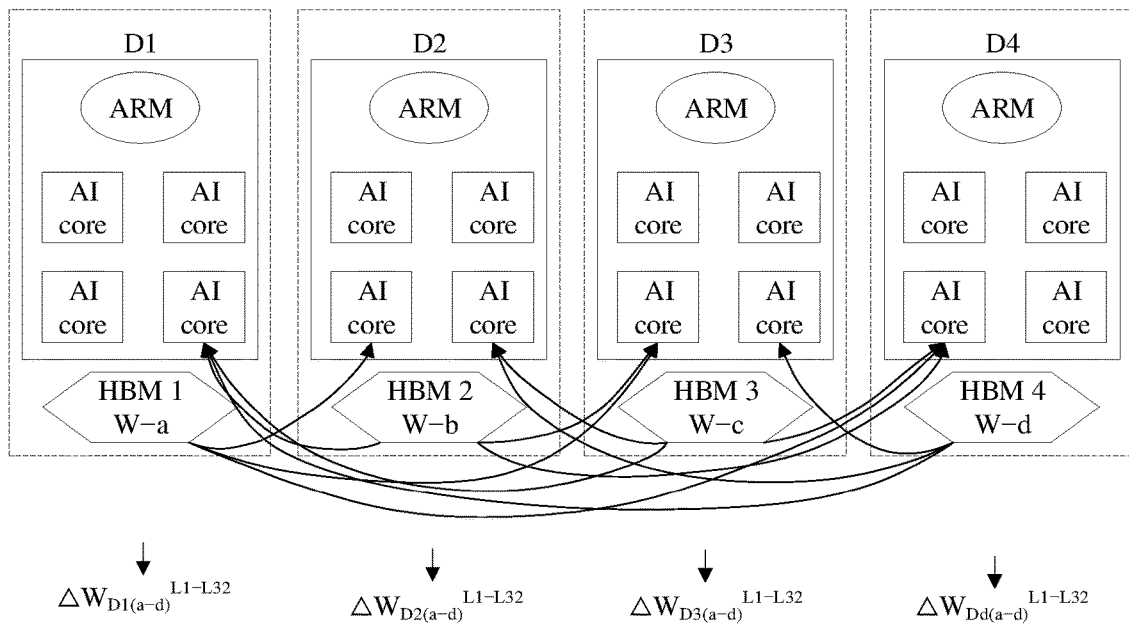
FIG. 12 is an example schematic diagram of a backward computation process according to an embodiment of this application.

For example, as shown in FIG. 9, to perform backward computation at the layer L32, a complete parameter of the layer L32 is required. The parameter of the layer L32 includes four parts stored in the four accelerators, that is, a first part $W_a^{L32}$, a second part $W_b^{L32}$, a third part $W_c^{L32}$, and a fourth part $W_d^{L32}$. As shown in FIG. 9, before backward computation at the layer L32 is performed, the four parts need to be respectively obtained from the four accelerators, to obtain the complete parameter of the layer L32. As shown in FIG. 12, the HBM of D1 (an example of the first accelerator) stores one part of the parameter of the layer L32, and the other three parts are respectively stored in the HBMs of D2 to D4. D1 obtains one part of the parameter of the layer L32 from the HMB 1, and respectively obtains the other three parts from the HBM 2, the HBM 3, and the HBM 4, to obtain the complete parameter of the layer L32.

All layers whose parameter needs to be obtained from another accelerator in a backward computation process of the neural network model may be understood as the $j^{th}$ layer. Before performing forward computation at any layer, if the first accelerator does not locally store a complete model parameter of the layer, the first accelerator may obtain different parameters of the layer locally and from the another accelerator, to obtain the complete model parameter of the layer.

It should be noted that the $i^{th}$ layer and the $j^{th}$ layer may be a same layer, or may be different layers. After forward computation is completed, if the first accelerator releases all parameters obtained from the another accelerator, the $i^{th}$ layer and the $j^{th}$ layer may be a same layer. After forward computation is completed, if the first accelerator releases only some parameters obtained from the another accelerator, the $i^{th}$ layer and the $j^{th}$ layer may be different layers. For example, the $i^{th}$ layer may include the layer L1 and a layer L5. After forward computation is complete, the parameter of the layer L1 and a parameter of the layer L5 are released. In the backward computation process, the $j^{th}$ layer may include the layer L1 and the layer L5. In this case, the $i^{th}$ layer and the $j^{th}$ layer are a same layer. For another example, the $i^{th}$ layer may include the layer L1 and a layer L5. After forward computation is complete, the parameter of the layer L1 is released. In the backward computation process, the $j^{th}$ layer may include the layer L1. In this case, the $i^{th}$ layer and the $j^{th}$ layer are different layers. The granularity at which the first accelerator obtains a parameter each time may be manually set, and specifically, may be set based on a hardware capability and a software requirement. For example, the granularity at which the first accelerator obtains a parameter each time is set according to storage space of the first accelerator.

For example, the neural network model includes 32 layers, and the first device performs backward computation in a sequence from a $32^{nd}$ layer to a $1^{st}$ layer. If intra-layer segmentation is performed at each layer in the neural network model, and obtained parts are stored in a plurality of accelerators, before performing backward computation at each layer, the first accelerator needs to obtain a complete parameter of the layer locally and from the another accelerator. If the granularity at which a parameter is obtained each time is a parameter of one layer, the first accelerator obtains a parameter of one layer each time in a sequence from the $32^{nd}$ layer to the $1^{st}$ layer. If the granularity at which a parameter is obtained each time is parameters of two layers, the first accelerator obtains parameters of the two layers each time in a sequence from the $32^{nd}$ layer to the $1^{st}$ layer. For example, the first accelerator obtains both different parameters of the $32^{nd}$ layer and different parameters of a $31^{st}$ layer locally and from the another accelerator, to obtain complete model parameters of the $32^{nd}$ layer and the $31^{st}$ layer. It should be noted that the foregoing is merely an example. In the backward computation process, the granularity at which the first accelerator obtains a parameter each time may be the same or may be different. For example, a granularity at which a parameter is obtained next may be determined based on storage space of a current first accelerator, provided that an obtained parameter includes a parameter of at least one layer. All of the at least one first accelerator may obtain a parameter at a same granularity or different granularities. Further, for N devices belonging to a same shared memory group, the N devices may obtain a same parameter.

For example, in FIG. 12, D1 to D4 belong to a same shared parameter group, and D1 to D4 are all used to train the neural network model. In other words, the at least one accelerator includes D1 to D4. The parameter of the $j^{th}$ layer includes four parts, and the four parts are respectively stored in the four accelerators. D1 obtains a first part of the parameter from D1, and obtains the other three parts from the other three accelerators, to obtain the complete model parameter of the $j^{th}$ layer. D2 obtains a second part of the parameter from D2, and obtains the other three parts from the other three accelerators, to obtain the complete model parameter of the $j^{th}$ layer. D3 obtains a third part of the parameter from D3, and obtains the other three parts from the other three accelerators, to obtain the complete model parameter of the $j^{th}$ layer. D4 obtains a fourth part of the parameter from D4, and obtains the other three parts from the other three accelerators, to obtain the complete model parameter of the $j^{th}$ layer. For example, a parameter is stored in an HBM, and obtaining the parameter may be loading the parameter from the HBM to a cache of an AI core. In other words, the four accelerators each need to obtain parameters from four HBMs.

If a parameter obtained from another accelerator is released after forward computation, in the backward computation process of the neural network model, the N accelerators need to load model parameters between the accelerators, and other data may be stored locally.

Optionally, after performing backward computation at the $j^{th}$ layer in the neural network model, the at least one first accelerator releases a parameter that is of the $j^{th}$ layer and that is obtained from the another accelerator.

Specifically, the first accelerator performs backward computation at the $j^{th}$ layer, to obtain a parameter gradient corresponding to the $j^{th}$ layer. The first accelerator stores some or all parameter gradients of the $j^{th}$ layer, and releases the parameter that is of the $j^{th}$ layer and that is obtained from the another accelerator. Some parameter gradients of the $j^{th}$ layer are parameter gradients corresponding to some parameters of the $j^{th}$ layer, and all parameter gradients of the $j^{th}$ layer are parameter gradients corresponding to the complete model parameter of the $j^{th}$ layer.

In other words, after performing backward computation at any layer, the first accelerator may store some or all parameter gradients of the layer. If a parameter of the layer includes a parameter obtained from the another accelerator, the parameter that is of the layer and that is obtained from the another accelerator is released.

The first accelerator may store some or all parameter gradients of the $j^{th}$ layer after completing backward computation at the $j^{th}$ layer, release the parameter that is of the $j^{th}$ layer and that is obtained from the another accelerator, and then perform backward computation at a $(j-1)^{th}$ layer. Alternatively, the first accelerator may store some or all parameter gradients of a corresponding layer after completing backward computation at any layer before the $j^{th}$ layer, and release the parameter that is of the $j^{th}$ layer and that is obtained from the another accelerator. The any layer before the $j^{th}$ layer is any layer whose layer number is less than j, for example, a $(j-1)^{th}$ layer or a $(j-2)^{th}$ layer.

For example, the first accelerator may store the parameter gradient in the HBM, and free the cache.

For example, the first accelerator separately obtains the different parameters of the layer L32 and the different parameters of the layer L31 locally and from the another accelerator, to obtain the complete model parameter of the layer L32 and the complete model parameter of the layer L31. The first accelerator performs backward computation at the layer L32, and outputs a parameter gradient of the layer L32 (an example of the first parameter gradient). The parameter gradient of the layer L32 is input to the layer L31. The first accelerator performs backward computation at the layer L31, and outputs a parameter gradient of the layer L31 (an example of the first parameter gradient). The first accelerator stores all or some parameter gradients of the layer L32 and all or some parameter gradients of the layer L32, and releases the parameter of the layer L32 and the parameter of the layer L31. Alternatively, the first accelerator performs forward computation at the layer L32, and outputs a parameter gradient of the layer L32 (an example of the first parameter gradient). The first accelerator stores some or all parameter gradients of the layer L32, and releases the parameter of the layer L32. The parameter gradient of the layer L32 is input to the layer L31. The first accelerator performs backward computation at the layer L31, and outputs a parameter gradient of the layer L31 (an example of the first parameter gradient). The first accelerator stores some or all parameter gradients of the layer L31, and releases the parameter of the layer L31.

According to the solution in this embodiment of this application, after backward computation is completed, the parameter obtained from the another accelerator is released, so that the space occupied by the model parameter in the training process can be further reduced, and the storage space occupied by the parameter in the entire training process can be small. In this way, each accelerator can support more training samples, the linearity of the training cluster is improved, and efficient training of the neural network model is implemented.

As described above, the first accelerator may store all the parameter gradients of the $j^{th}$ layer, or may store the some parameter gradients of the $j^{th}$ layer.

The some parameter gradients of the $j^{th}$ layer may be parameter gradients corresponding to the some parameters of the $j^{th}$ layer that are stored in the first accelerator.

Each of the at least one accelerator performs backward computation based on different forward computation results, to obtain the first parameter gradient. The first parameter gradient may include a parameter gradient that is of the neural network model and that is obtained through computation by each of the at least one accelerator.

The following describes the backward computation process by using the neural network model shown in FIG. 9 as an example, and does not constitute a limitation on the solution of this embodiment of this application.

As shown in FIG. 12, before performing backward computation at the layer L32, each accelerator obtains a parameter of at least one layer, and the parameter of the at least one layer includes the parameter of the layer L32. In other words, to perform backward computation at the layer L32, each accelerator may load the parameter of the layer L32, that is, load the parameter on the basis of one layer, or may load parameters of a plurality of layers including the layer L32, that is, load the parameters on the basis of a plurality of layers.

With reference to FIG. 12, the following describes the backward computation process by using an example in which the accelerator loads the parameter on the basis of one layer.

Step 1: The four accelerators load the parameter of the layer L32.

For example, the four accelerators may load the parameter of the layer L32 through all-gather. For example, the four accelerators each load the first part $W_a^{L32}$ of the parameter of the layer L32 from the HBM 1, load the second part $W_b^{L32}$ of the parameter of the layer L32 from the HBM 2, load the third part $W_c^{L32}$ of the parameter of the layer L32 from the HBM 3, and load the fourth part $W_d^{L32}$ of the parameter of the layer L32 from the HBM 4, to obtain the parameter of the layer L32. Specifically, the four accelerators each load a parameter to a cache of a respective AI core. In this way, the cache of the AI core of each of the four accelerators stores the complete parameter of the layer L32.

Step 2: The four accelerators each perform backward computation at the layer L32 to obtain the parameter gradient of the layer L32 (an example of the first parameter gradient), and store the some or all parameter gradients of the layer L32 in a local HBM.

Further, the cache of the AI core may be freed after backward computation at the layer L32 is completed.

Step 3: The four accelerators sequentially perform backward computation at the layer L31 to the layer L1.

Backward computation at the layer L31 to the layer L1 is sequentially performed based on a backward computation process at the layer L32, until backward computation at each layer is completed.

With reference to FIG. 12, the following describes the backward computation process by using an example in which the accelerator loads the parameter on the basis of a plurality of layer.

Step 1: The four accelerators load the parameter of the layer L32 and the parameter of the layer L31. In other words, the parameter is loaded on the basis of two layers.

For example, the four accelerators may load the parameter of the layer L32 and the parameter of the layer L31 through all-gather. For example, the four accelerators each load the first part $W_a^{L32}$ of the parameter of the layer L32 and a first part $W_a^{L31}$ of the parameter of the layer L31 from the HBM 1, load the second part $W_b^{L32}$ of the parameter of the layer L32 and a second part $W_b^{L31}$ of the parameter of the layer L31 from the HBM 2, load the third part $W_c^{L32}$ of the parameter of the layer L32 and a third part $W_c^{L31}$ of the parameter of the layer L31 from the HBM 3, and load the fourth part $W_d^{L32}$ of the parameter of the layer L32 and a fourth part $W_d^{L31}$ of the parameter of the layer L31 from the HBM 4. Specifically, the four accelerators each load a parameter to a cache of a respective AI core. In this way, the cache of the AI core of each accelerator stores the complete parameter of the layer L32 and a complete parameter of the layer L31.

Step 2: The four accelerators each sequentially perform backward computation at the layer L32 and the layer L31, to obtain the parameter gradient of the layer L32 and the parameter gradient of the layer L31 (an example of the first parameter gradient), and store the some or all parameter gradients of the layer L32 and the some or all parameter gradients of the layer L31 in a local HBM.

Further, the cache of the AI core may be freed after backward computation at the layer L31 is completed.

Step 3: Sequentially perform backward computation at a layer L30 to the layer L1.

Backward computation at the layer L30 to the layer L1 is sequentially performed based on a backward computation process at the layer L32 and the layer L31, until backward computation at each layer is completed.

It should be understood that a parameter needs to be loaded for a plurality of times in the entire backward computation process. The foregoing provides descriptions by using an example in which a parameter is loaded at a same granularity each time. In a specific implementation process, a granularity at which a parameter is loaded each time may be different. For example, the parameter is loaded on the basis of one layer at a first time, and the parameter is loaded on the basis of two layers at a second time. The granularity at which a parameter is loaded is not limited in this embodiment of this application. In a specific implementation process, the granularity at which a parameter is loaded may alternatively be selected based on a hardware capability and a software requirement.

Optionally, obtaining a parameter and backward computation may be performed in serial, or may be performed in an overlapping (overlap) manner.

That obtaining a parameter and backward computation are performed in serial means that, after backward computation at one or more layers is completed, a parameter of a layer before the one or more layers is obtained.

In this embodiment of this application, a layer before a specific layer is a layer whose layer number is less than that of the layer.

For example, as shown in (a) in FIG. 11, each accelerator loads a parameter of one layer each time, and then performs backward computation at the layer. After backward computation at the layer is completed, a parameter of a next layer is loaded, and then backward computation at the next layer is performed, until backward computation of the entire model is completed.

That obtaining a parameter and backward computation are performed in the overlapping manner means that, in a time period in which backward computation at one or more layers is performed, a parameter of a layer after the one or more layers is obtained.

Alternatively, it may be understood that, in a time period in which the at least one first accelerator performs backward computation at any one or more layers after the $j^{th}$ layer in the neural network model, the at least one first accelerator obtains the different parameters of the $j^{th}$ layer locally and from the another accelerator, to obtain the complete model parameter of the $j^{th}$ layer.

It should be noted that, obtaining a parameter of another layer in a time period of backward computation at a current layer may be understood as performing an operation of obtaining the parameter of the another layer in the time period of backward computation at the current layer. It is not specified that a time period in which the parameter of the another layer is obtained completely falls within the time period of backward computation at the current layer.

For example, as shown in (b) in FIG. 11, each accelerator loads a parameter of one layer each time, and then performs backward computation at the layer. In a time period in which backward computation at the layer is performed, a parameter of a next layer is loaded, and then backward computation at the next layer is performed, until backward computation of the entire model is completed. For example, in a time period in which backward computation at the layer L32 is performed, the parameter of the layer L31 starts to be loaded.

Obtaining a parameter and backward computation are overlapped, to reduce a communication time period that cannot be hidden in the computation process, improve training efficiency, and improve training performance of the cluster.

According to the solution in this embodiment of this application, the parameter obtained from the another device may be released after forward computation is completed, and a required parameter is obtained again in a backward computation process, to reduce storage space occupied by the parameter in the training process.

In addition, a parameter obtained from another device may be released after backward computation is completed, to further reduce the storage space occupied by the parameter in the training process, and reduce storage space occupied by the parameter in the entire training process.

The following describes the parameter updating process, that is, step S1040.

Optionally, each of the at least one first accelerator updates a locally stored model parameter based on the first parameter gradient of the neural network model.

The first parameter gradient may be understood as a parameter gradient obtained by the first accelerator through backward computation. In other words, the first accelerator may update the locally stored model parameter based on the parameter gradient obtained by the first accelerator through backward computation.

Further, each of the at least one first accelerator receives a second parameter gradient that is of the neural network model and that is sent by the another accelerator, and each updates the parameter of the neural network model based on the first parameter gradient and the second parameter gradient.

For example, the parameter of the neural network model is updated based on a sum of the first parameter gradient and the second parameter gradient.

The first accelerator receives the second parameter gradient sent by another accelerator. The "another accelerator" may belong to the at least one first accelerator, or may not belong to the at least one first accelerator.

In this embodiment of this application, a parameter gradient obtained by each first accelerator through computation is referred to as a first parameter gradient, and a parameter gradient obtained by another accelerator through computation is referred to as a second parameter gradient.

For example, the "another accelerator" may belong to the at least one first accelerator. In other words, the at least one first accelerator includes two or more first accelerators. The parameter gradient obtained by the at least one first accelerator through backward computation is processed, and the locally stored model parameter is updated based on a processing result.

For example, a processing manner may be summation processing. Summation processing is performed on the parameter gradient obtained by the at least one first accelerator through backward computation, and each of the at least one first accelerator updates the locally stored model parameter based on a summation processing result. In other words, each of the at least one first accelerator updates the locally stored model parameter based on a same result.

Further, each of the at least one first accelerator sends the first parameter gradient to the another accelerator.

The another accelerator each may update the locally stored model parameter based on the first parameter gradient.

That the first accelerator sends the first parameter gradient to the another accelerator may include: The first accelerator sends all of the first parameter gradient to the another accelerator; or the first accelerator sends a part of the first parameter gradient to the another accelerator.

For example, one shared memory group includes N accelerators. The first accelerator may update the locally stored model parameter based on a parameter gradient corresponding to a locally stored parameter in the first parameter gradient, and send the first parameter gradient to the other N−1 accelerators, so that the other N−1 accelerators each update a locally stored model parameter. Alternatively, the first accelerator may send, to each of the other N−1 accelerators, a parameter gradient other than a parameter gradient corresponding to a locally stored parameter in the first parameter gradient, so that the other N−1 accelerators each update a locally stored model parameter.

A parameter gradient transmission process may be understood as a parameter gradient synchronization process between a plurality of accelerators. After a parameter gradient is synchronized, model parameters in the plurality of accelerators are obtained through updating based on a same parameter gradient.

As described above, the first accelerator may store some or all parameter gradients of the $j^{th}$ layer. After the first accelerator synchronizes the parameter gradient of the $j^{th}$ layer with the another accelerator, in other words, after the first accelerator sends the parameter gradient of the $j^{th}$ layer to the another accelerator, only a parameter gradient corresponding to a locally stored model parameter of the $j^{th}$ layer may be stored, and another parameter gradient of the $j^{th}$ layer is released or discarded.

The parameter gradient may be synchronized through collective communication. For example, the at least one first accelerator includes two or more first accelerators, and all accelerators in the at least one accelerator synchronize the parameter gradient. An all-reduce operation is performed between a parameter gradient in the at least one accelerator. To be specific, summation processing is performed on the parameter gradient obtained by the at least one accelerator through backward computation, to obtain an accumulated parameter gradient. Each accelerator stores the accumulated parameter gradient. The at least one accelerator updates a locally stored parameter of the neural network model based on the accumulated parameter gradient. Alternatively, a reduce-scatter operation is performed between a parameter gradient in the at least one accelerator. To be specific, summation processing is performed on the parameter gradient obtained by the at least one accelerator through backward computation, to obtain an accumulated parameter gradient. Each accelerator stores a parameter gradient corresponding to a locally stored parameter in the accumulated parameter gradient. The at least one accelerator updates a locally stored parameter of the neural network model based on a parameter gradient corresponding to a locally stored parameter.

Further, a neural network model training system may include M servers, and each of the M servers includes at least one accelerator. M is an integer greater than or equal to 1.

Optionally, the at least one first accelerator is located in a first server.

In other words, the at least one first accelerator is located in a same server.

Optionally, the at least one first accelerator includes two or more first accelerators; and that each of the at least one first accelerator receives the second parameter gradient that is of the neural network model and that is sent by the another accelerator includes: Each of the at least one first accelerator receives simultaneously the second parameter gradient that is of the neural network model and that is sent by an accelerator in another server.

In other words, when the server includes a plurality of network interface cards, a plurality of first accelerators may simultaneously perform transmission of the parameter gradient with another server.

For example, when M is greater than 1, after a plurality of first accelerators in a same server synchronize the parameter gradient, devices of different servers may synchronize the parameter gradient.

The following provides descriptions by using an example in which each server includes N accelerators. That each server includes N accelerators means that a quantity of accelerators currently used for training a same neural network model in each server is N.

The M servers include N*M accelerators. If one accelerator may train m training samples, the N*M accelerators may train N*M*m training samples in parallel.

When M is greater than 1, after N accelerators in a same server synchronize the parameter gradient, the accelerators in the servers may synchronize the parameter gradient.

For example, when each server includes N network interface cards, after an all-reduce operation is performed between parameter gradients in N accelerators in a same server, an all-reduce operation may be performed between parameter gradients in the accelerators in the M servers, and all the accelerators of the M servers each may update a locally stored parameter of the neural network model based on the synchronized parameter gradient.

Further, the N accelerators in each of the M servers may be in a one-to-one correspondence with N accelerators in another server in the M servers. In other words, the N accelerators in each of the M servers may store a same parameter partition as the N accelerators in the another server in the M servers. In this case, the N accelerators in each server belong to a same shared memory group.

For example, when each server includes N network interface cards, a reduce-scatter operation is performed between parameter gradients in N accelerators in a same server, to obtain a parameter gradient corresponding to a locally stored parameter of the neural network model. An all-reduce operation may be performed between parameter gradients in accelerators corresponding to the M servers. In other words, the N accelerators in each of the M servers perform an all-reduce operation on a parameter gradient corresponding to a locally stored parameter of the neural network model with corresponding accelerators in the other M−1 servers, to obtain a target parameter gradient. For example, each accelerator in each of the M servers performs summation processing on a locally stored parameter gradient and a parameter gradient stored in a corresponding accelerator in the other M−1 servers, and stores a parameter gradient obtained after summation processing. In this way, each accelerator may store a parameter gradient corresponding to a locally stored parameter. All accelerators in the M servers each may update a locally stored parameter of the neural network model based on a locally stored parameter gradient. The corresponding accelerator in the other M−1 servers is an accelerator that is in the other M−1 servers and that stores a same parameter as an accelerator in the current server.

For example, the system includes a server 1 and a server 2, an accelerator 11 in the server 1 stores a first part of the parameter of the neural network model, and an accelerator 21 in the server 2 stores the first part of the parameter of the neural network model. In this case, there is a correspondence between the accelerator 11 in the server 1 and the accelerator 21 in the server 2. To be specific, the accelerator 11 is an accelerator that is in the server 1 and that corresponds to the accelerator 21 in the server 2, and the accelerator 21 is an accelerator that is in the server 2 and that corresponds to the accelerator 11 in the server 1. A reduce-scatter operation is performed between a parameter gradient in the accelerator 11 and a parameter gradient in an accelerator in the server 1, a reduce-scatter operation is performed between a parameter gradient in the accelerator 12 and a parameter gradient in an accelerator in the server 2, an all-reduce operation is performed between a parameter gradient in the accelerator 11 and a parameter gradient in the accelerator 21, and a same operation is performed for the other N−1 accelerators in the server 1 and the other N−1 accelerators in the server 2. Accelerators in the server 1 and accelerators in the server 2 update a locally stored model parameter based on a locally stored parameter gradient.

Figure 13:
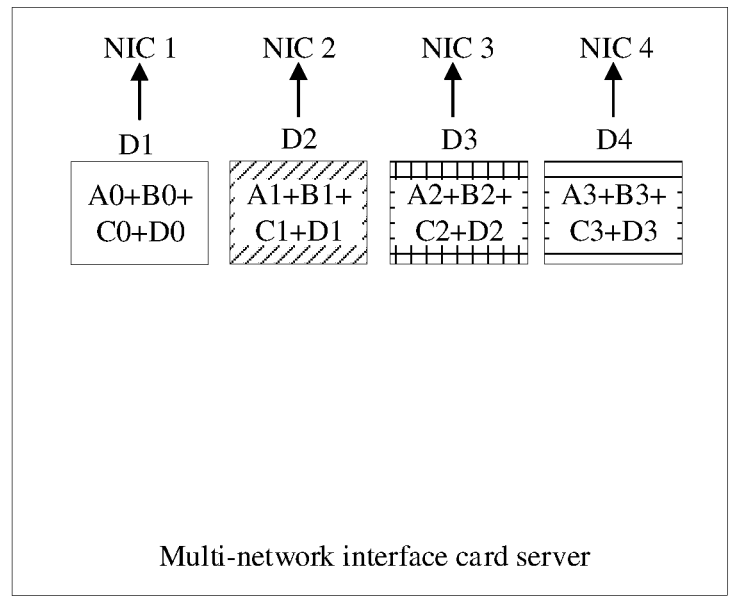
FIG. 13 is an example schematic diagram of a parameter gradient synchronization process existing in different network interface card scenarios according to an embodiment of this application.
Figure 13:
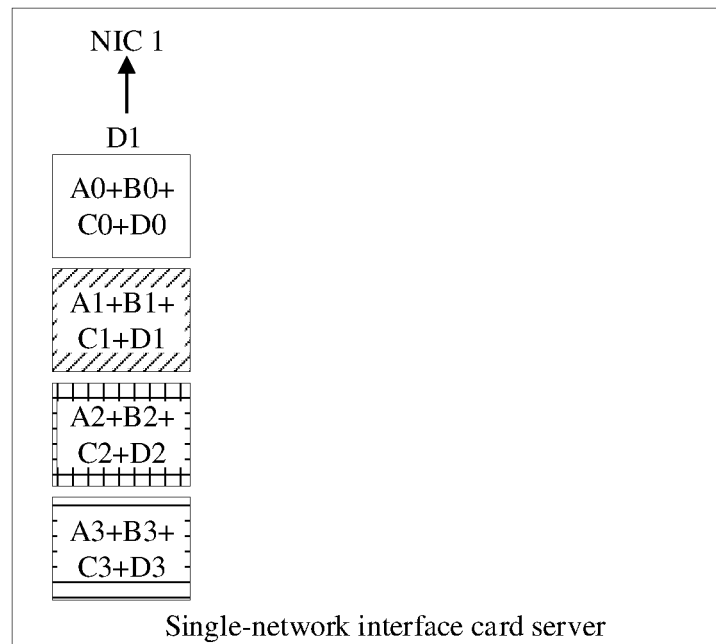

As shown in (a) in FIG. 13, each server is a multi-network interface card server, and each server includes four accelerators and four network interface cards: an NIC 1, an NIC 2, an NIC 3, and an NIC 4. A0 to A3 respectively represent parameter gradients corresponding to parameters in four parameter partitions in a parameter gradient obtained by D1 through backward computation, B0 to B3 respectively represent parameter gradients corresponding to parameters in four parameter partitions in a parameter gradient obtained by D2 through backward computation, and C0 to C3 respectively represent parameter gradients corresponding to parameters in four parameter partitions in a parameter gradient obtained by D3 through backward computation. D0 to D3 respectively represent parameter gradients corresponding to parameters in four parameter partitions in a parameter gradient obtained by D4 through backward computation. After a reduce-scatter operation is performed, a parameter gradient stored in D1 is a parameter gradient A0+B0+C0+D0 corresponding to a parameter stored in D1, and a parameter gradient stored in another accelerator is shown in FIG. 13. D1 to D4 each perform an all-reduce operation between parameter gradients by using the NIC 1 to the NIC 4.

For example, when each server includes only a single network interface card, a reduce operation may be first performed between parameter gradients in N accelerators in a same server, and then an all-reduce operation is performed, between servers by using one network interface card, on parameter gradients obtained after the reduce operation.

As shown in (b) in FIG. 13, each server is a single-network interface card server, and each server includes four accelerators and one network interface card: an NIC 1. After the reduce operation is performed, parameter gradients stored in D1 are parameter gradients A0+B0+C0+D0, A1+B1+C1+D1, A2+B2+C2+D2, and A3+B3+C3+D3 corresponding to all parameters of the neural network model. D1 performs an all-reduce operation between parameter gradients by using the NIC 1 with an accelerator in another server.

In this way, when the server includes a plurality of network interface cards, after a reduce-scatter operation is performed in the server, the plurality of network interface cards may be used to simultaneously perform an all-reduce operation on a parameter gradient, to improve all-reduce performance between servers, reduce a communication time period, improve communication efficiency, and improve cluster training performance.

Performing synchronization based on parameter gradients obtained through backward computation by all accelerators participating in training is performing synchronization based on parameter gradients obtained through backward computation based on training samples on all the accelerators participating in training, and performing synchronization based on parameter gradients obtained through backward computation by using some accelerators is performing synchronization based on parameter gradients obtained through backward computation based on training samples in some of all accelerators participating in training. Therefore, compared with a case in which a model parameter is updated based on a parameter gradient in some accelerators, in a case in which a parameter is updated based on a parameter gradient in all accelerators, more training samples can be used, and the parameter of the neural network model is updated based on the accumulated parameter gradient, to obtain an optimal value that can better approximate the parameter, and improve model training accuracy.

The parameter gradient may be synchronized in the backward computation process, or may be synchronized after backward computation of the entire neural network model is completed.

A parameter gradient in a parameter synchronization process may be parameter gradients of some layers of the neural network model or parameter gradients of all layers.

The following describes the parameter updating process and the backward computation process by using two examples (Example 1 and Example 2).

Example 1

After completing backward computation at all layers, each accelerator obtains all parameter gradients of the neural network model, and synchronization is performed based on all parameter gradients obtained by each accelerator.

In other words, in one iteration process, each accelerator stores all the parameter gradients of the neural network model that are obtained by the accelerator through computation.

Figure 14:
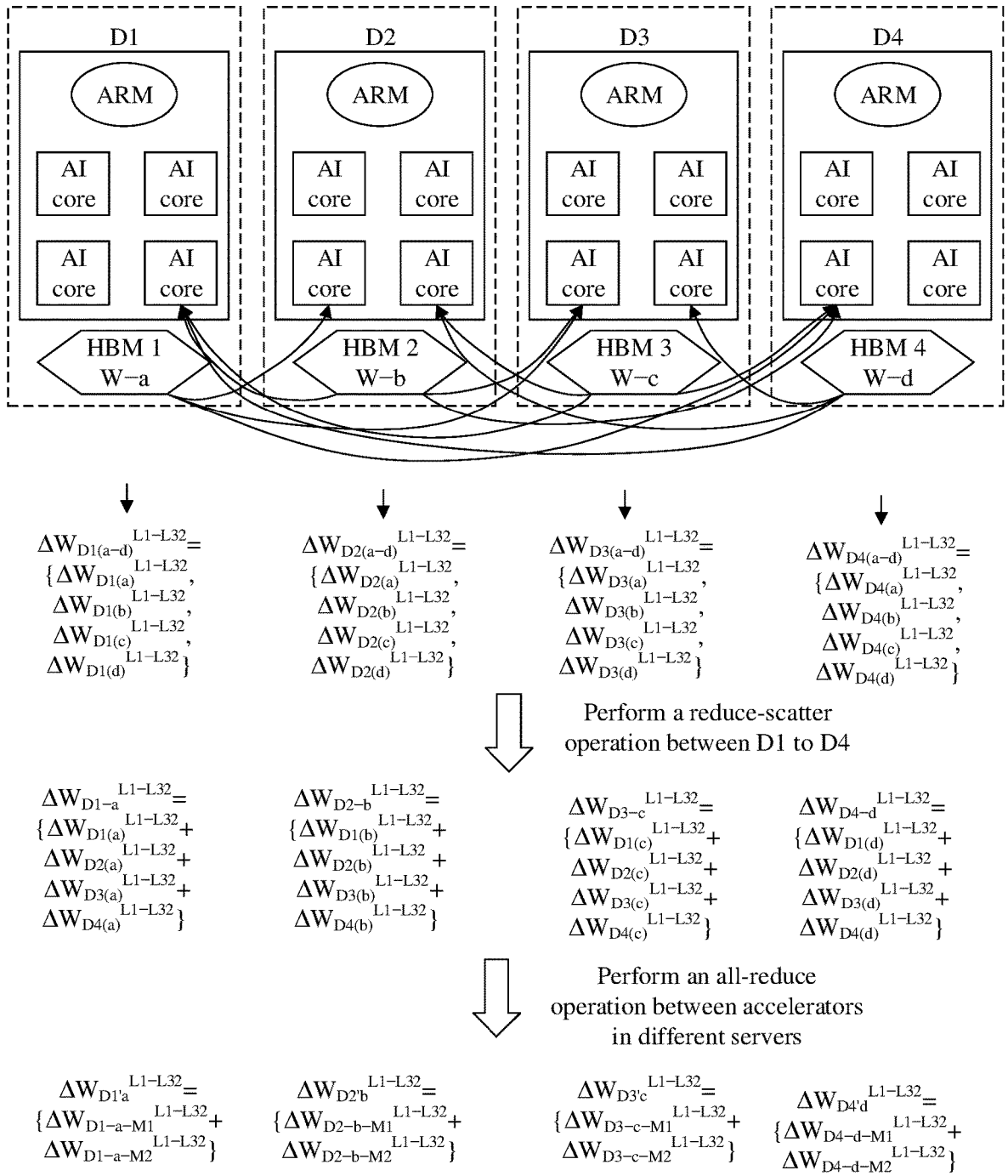
FIG. 14 is an example schematic flowchart of a parameter gradient synchronization process according to an embodiment of this application.

For example, as shown in FIG. 14, D1 stores parameter gradients $\Delta W_{D1(a-d)}^{L32-L1} = \{\Delta W_{D1(a)}^{L32-L1}, \Delta W_{D1(b)}^{L32-L1}, \Delta W_{D1(c)}^{L32-L1}, \Delta W_{D1(d)}^{L32-L1}\}$ that correspond to all parameters of the layer L1 to the layer L32 and that are obtained by D1 through computation. Alternatively, it may be understood that, D1 stores parameter gradients that correspond to all parameters of the layer L1 to the layer L32 and that are obtained based on a locally stored training sample.

D2 stores parameter gradients $\Delta W_{D2(a-d)}^{L32-L1} = \{\Delta W_{D2(a)}^{L32-L1}, \Delta W_{D2(b)}^{L32-L1}, \Delta W_{D2(c)}^{L32-L1}, \Delta W_{D2(d)}^{L32-L1}\}$ that correspond to all parameters of the layer L1 to the layer L32 and that are obtained by D2 through computation. Alternatively, it may be understood that, D2 stores parameter gradients that correspond to all parameters of the layer L1 to the layer L32 and that are obtained based on a locally stored training sample.

The same is true of D3 and D4. D3 stores $\Delta W_{D3(a-d)}^{L32-L1} = \{\Delta W_{D3(a)}^{L32-L1}, \Delta W_{D3(b)}^{L32-L1}, \Delta W_{D3(c)}^{L32-L1}, \Delta W_{D3(d)}^{L32-L1}\}$, and D4 stores $\Delta W_{D4(a-d)}^{L32-L1} = \{\Delta W_{D4(a)}^{L32-L1}, \Delta W_{D4(b)}^{L32-L1}, \Delta W_{D4(c)}^{L32-L1}, \Delta W_{D4(d)}^{L32-L1}\}$.

$\Delta W_{D1(a)}^{L32-L1}, \Delta W_{D1(b)}^{L32-L1}, \Delta W_{D1(c)}^{L32-L1}, \Delta W_{D1(d)}^{L32-L1}$ respectively represent a parameter gradient corresponding to the first part a, a parameter gradient corresponding to the second part b, a parameter gradient corresponding to the third part c, and a parameter gradient corresponding to the fourth part d that are in all the parameters of the layer L1 to the layer L32 and that are obtained by D1 through computation. Another parameter gradient is obtained by analogy.

For example, a reduce-scatter operation is performed on the parameter gradients $\Delta W_{D(a-d)}^{L32-L1}$ that correspond to all parameters of the layer L1 to the layer L32 and that are obtained by D1 through computation, the parameter gradients $\Delta W_{D2(a-d)}^{L32-L1}$ that correspond to all parameters of the layer L1 to the layer L32 and that are obtained by D2 through computation, the parameter gradients $\Delta W_{D3(a-d)}^{L32-L1}$ that correspond to all parameters of the layer L1 to the layer L32 and that are obtained by D3 through computation, and the parameter gradients $\Delta W_{D4(a-d)}^{L32-L1}$ that correspond to all parameters of the layer L1 to the layer L32 and that are obtained by D4 through computation.

For example, after all parameter gradients in the four accelerators are summed, an accumulated parameter gradient is allocated to each accelerator. Specifically, a result that is of the reduce-scatter operation and that is obtained by D1 is a parameter gradient $\Delta W_{D1-a}^{L32-L1}$ corresponding to the first part of the parameters of the layer L1 to the layer L32 in the accumulated parameter gradient, a result that is of the reduce-scatter operation and that is obtained by D2 is a parameter gradient $\Delta W_{D2-b}^{L32-L1}$ corresponding to the second part of the parameters of the layer L1 to the layer L32 in the accumulated parameter gradient, a result that is of the reduce-scatter operation and that is obtained by D3 is a parameter gradient $\Delta W_{D3-c}^{L32-L1}$ corresponding to the third part of the parameters of the layer L1 to the layer L32 in the accumulated parameter gradient, and a result that is of the reduce-scatter operation and that is obtained by D4 is a parameter gradient $\Delta W_{D4-d}^{L32-L1}$ corresponding to the fourth part of the parameters of the layer L1 to the layer L32 in the accumulated parameter gradient. The four accelerators each may update a parameter for which the four accelerators each are responsible, that is, a locally stored parameter based on the parameter gradients.

Further, after completing backward computation at all layers, each accelerator in all servers obtains all the parameter gradients of the neural network model, and synchronization is performed based on all parameter gradients obtained by each accelerator in all the servers.

For example, there are N*M accelerators used to train the neural network model, the accelerators are located in M servers, and each server includes N accelerators. Parameter partitions in N devices in each server are the same.

In an implementation, after a server obtains corresponding parameter gradients in four accelerators with reference to the foregoing reduce-scatter operation, an all-reduce operation is performed between corresponding accelerators in each server.

Specifically, as shown in FIG. 14, accelerators D1 in all servers synchronize a parameter gradient $\Delta W_a$ corresponding to the first part a, that is, implement an all-reduce operation on $\Delta W_{D1-a}^{L32-L1}$, for example, $\Delta W_{D1'a}^{L32-L1} = \Delta W_{D1-a-M1}^{L32-L1} + \Delta W_{D1-a-M2}^{L32-L1}$, and locally store a result $\Delta W_{D1'a}^{L32-L1}$; accelerators D2 in all the servers synchronize a parameter gradient $\Delta W_b$ corresponding to the second part b, that is, implement an all-reduce operation on $\Delta W_{D2-b}^{L32-L1}$, for example, $\Delta W_{D2'b}^{L32-L1} = \Delta W_{D2-b-M1}^{L32-L1} + \Delta W_{D2-b-M2}^{L32-L1}$, and locally store a result $\Delta W_{D2'b}^{L32-L1}$; accelerators D3 in all the servers synchronize a parameter gradient $\Delta W_c$ corresponding to the third part c, that is, implement an all-reduce operation on $\Delta W_{D3-c}^{L32-L1}$, for example, $\Delta W_{D3'c}^{L32-L1} = \Delta W_{D3-c-M1}^{L32-L1} + \Delta W_{D3-c-M2}^{L32-L1}$, and locally store a result $\Delta W_{D3'c}^{L32-L1}$; and accelerators D4 in all the servers synchronize a parameter gradient $\Delta W_d$ corresponding to the fourth part d, that is, implement an all-reduce operation on $\Delta W_{D4-d}^{L32-L1}$, for example, $\Delta W_{D4'd}^{L32-L1} = \Delta W_{D4-d-M1}^{L32-L1} + \Delta W_{D4-d-M2}^{L32-L1}$, and locally store a result $\Delta W_{D4'd}^{L32-L1}$. The four accelerators in each server each may update a parameter for which the four accelerators each are responsible, that is, a locally stored parameter based on the parameter gradients.

$\Delta W_{D1\text{-}a\text{-}M1}^{L32\text{-}L1}$ represents a parameter gradient that corresponds to the first part a of the parameters of the layer L1 to the layer L32 and that is obtained after D1 in a server M1 completes reduce-scatter, and $\Delta W_{D1\text{-}a\text{-}M2}^{L32\text{-}L1}$ represents a parameter gradient that corresponds to the first part a of the parameters of the layer L1 to the layer L32 and that is obtained after D1 in a server M2 completes reduce-scatter. Another parameter is obtained by analogy.

In this way, when the server is a multi-network interface card server, a parameter gradient may be synchronized by using a plurality of network interface cards simultaneously, to reduce time costs, improve communication efficiency, and further improve model training efficiency. For example, the plurality of network interface cards are used to perform an all-reduce operation, to improve communication efficiency, and further improve cluster training performance.

In an implementation, a reduce operation is performed on a parameter gradient between accelerators in a server, and a result is stored in one of the accelerators. An all-reduce operation is performed between corresponding accelerators in each server.

Example 2

When memory of an accelerator is small, all gradient parameters of the entire neural network model possibly cannot be stored. In this case, each accelerator may store only a parameter gradient corresponding to a parameter for which the accelerator is responsible.

Optionally, after completing backward computation at one or more layers, each accelerator obtains a parameter gradient corresponding to the one or more layers, performs synchronization based on the parameter gradient that corresponds to the one or more layers and that is obtained by each accelerator, and stores a parameter gradient corresponding to a locally stored parameter. Each accelerator updates the locally stored parameter based on the parameter gradient. The foregoing process is repeated, until parameters of all layers are updated.

In one iteration process, each accelerator may store only a parameter gradient of one or more layers that is obtained by the accelerator.

Figure 15:
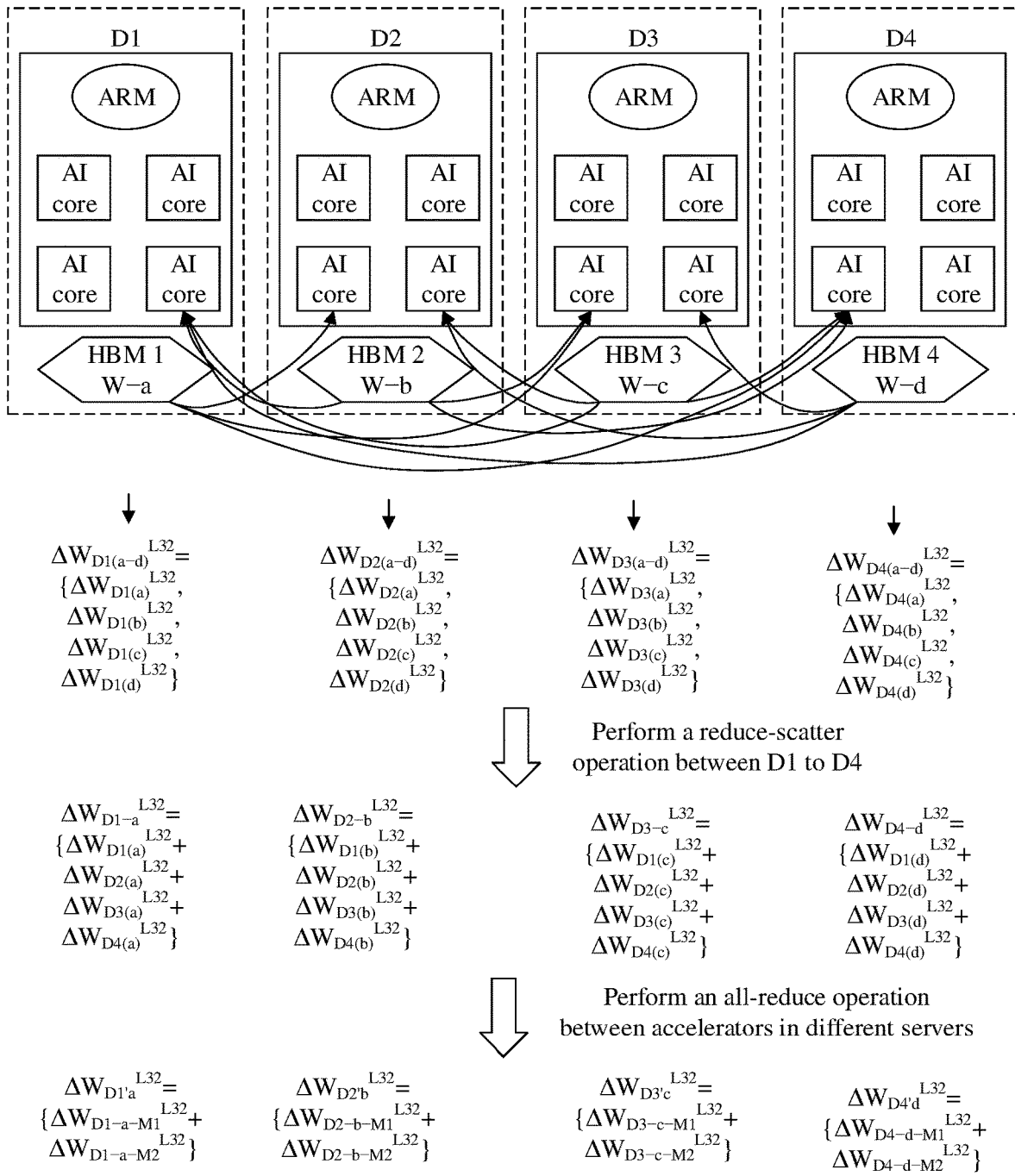
FIG. 15 is an example schematic flowchart of another parameter gradient synchronization process according to an embodiment of this application.

For example, as shown in FIG. 15, after the four accelerators complete backward computation at the layer L32, D1 obtains a parameter gradient $\Delta W_{D1(a\text{-}d)}^{L32} = \{\Delta W_{D1(a)}^{L32}, \Delta W_{D1(b)}^{L32}, \Delta W_{D1(c)}^{L32}, \Delta W_{D1(d)}^{L32}\}$ of the layer L32 through computation. Alternatively, it may be understood that, D1 obtains the parameter gradient of the layer L32 based on a first training sample. D2 obtains a parameter gradient $\Delta W_{D2(a\text{-}d)}^{L32} = \{\Delta W_{D2(a)}^{L32}, \Delta W_{D2(b)}^{L32}, \Delta W_{D2(c)}^{L32}, \Delta W_{D2(d)}^{L32}\}$ of the layer L32 through computation. Alternatively, it may be understood that, D2 obtains the parameter gradient of the layer L32 based on a second training sample. The same is true of D3 and D4. D3 stores $\Delta W_{D3(a\text{-}d)}^{L32} = \{\Delta W_{D3(a)}^{L32}, \Delta W_{D3(b)}^{L32}, \Delta W_{D3(c)}^{L32}, \Delta W_{D3(d)}^{L32}\}$, and D4 stores $\Delta W_{D4(a\text{-}d)}^{L32} = \{\Delta W_{D4(a)}^{L32}, \Delta W_{D4(b)}^{L32}, \Delta W_{D4(c)}^{L32}, \Delta W_{D4(d)}^{L32}\}$.

$\Delta W_{D1(a)}^{L32}, \Delta W_{D1(b)}^{L32}, \Delta W_{D1(c)}^{L32}, \Delta W_{D1(d)}^{L32}$ respectively represent a parameter gradient corresponding to the first part a, a parameter gradient corresponding to the second part b, a parameter gradient corresponding to the third part c, and a parameter gradient corresponding to the fourth part d that are in all the parameters of the layer L32 and that are obtained by D1 through computation. Another parameter gradient is obtained by analogy.

For example, a reduce-scatter operation is performed on the parameter gradient $\Delta W_{D1(a\text{-}d)}^{L32}$ that is of the layer L32 and that is obtained by D1 through computation, the parameter gradient $\Delta W_{D2(a\text{-}d)}^{L32}$ that is of the layer L32 and that is obtained by D2 through computation, the parameter gradient $\Delta W_{D3(a\text{-}d)}^{L32}$ that is of the layer L32 and that is obtained by D3 through computation, and the parameter gradient $\Delta W_{D4(a\text{-}d)}^{L32}$ that is of the layer L32 and that is obtained by D4 through computation.

For example, after parameter gradients of the layer L32 in the four accelerators are summed, an accumulated parameter gradient is allocated to each accelerator. Specifically, a result that is of the reduce-scatter operation and that is obtained by D1 is a parameter gradient $\Delta W_{D1\text{-}a}^{L32}$ corresponding to the first part of the parameter of the layer L32, a result that is of the reduce-scatter operation and that is obtained by D2 is a parameter gradient $\Delta W_{D2\text{-}b}^{L32}$ corresponding to the second part of the parameter of the layer L32, a result that is of the reduce-scatter operation and that is obtained by D3 is a parameter gradient $\Delta W_{D3\text{-}c}^{L32}$ corresponding to the third part of the parameter of the layer L32, and a result that is of the reduce-scatter operation and that is obtained by D4 is a parameter gradient $\Delta W_{D4\text{-}d}^{L32}$ corresponding to the fourth part of the parameter of the layer L32. The four accelerators each may update a parameter for which the four accelerators each are responsible, that is, a locally stored parameter of the layer L32 based on the parameter gradients.

The foregoing process is repeated, until the parameters of the 32 layers are updated.

Further, after completing backward computation at one or more layers, each accelerator in all servers obtains parameter gradients of the one or more layers in the neural network model, and synchronization is performed based on the parameter gradients that are of the one or more layers and that are obtained by each accelerator in all the servers.

For example, there are N*M accelerators used to train the neural network model, the accelerators are located in M servers, and each server includes N accelerators. Parameter partitions in N devices in each server are the same.

In an implementation, after backward computation at one or more layers is completed, and a server obtains corresponding parameter gradients in four accelerators with reference to the foregoing reduce-scatter operation, an all-reduce operation is performed between corresponding accelerators in each server.

Specifically, as shown in FIG. 15, accelerators D1 in all servers synchronize a parameter gradient $\Delta W_a$ corresponding to the first part a, that is, implement an all-reduce operation on $\Delta W_{D1\text{-}a}^{L32}$, for example, $\Delta W_{D1'a}^{L32} = \Delta W_{D1\text{-}a\text{-}M1}^{L32} + \Delta W_{D1\text{-}a\text{-}M2}^{L32}$, and locally store a result $\Delta W_{D1'a}^{L32}$; accelerators D2 in all the servers synchronize a parameter gradient $\Delta W_b$ corresponding to the second part b, that is, implement an all-reduce operation on $\Delta W_{D2\text{-}b}^{L32}$, for example, $\Delta W_{D2'a}^{L32} = \Delta W_{D2\text{-}b\text{-}M1}^{L32} + \Delta W_{D2\text{-}b\text{-}M2}^{L32}$, and locally store a result $\Delta W_{D2'b}^{L32}$; accelerators D3 in all the servers synchronize a parameter gradient $\Delta W_c$ corresponding to the third part c, that is, implement an all-reduce operation on $\Delta W_{D3\text{-}c}^{L32}$, for example, $\Delta W_{D3'c}^{L32} = \Delta W_{D3\text{-}c\text{-}M1}^{L32} + \Delta W_{D3\text{-}c\text{-}M2}^{L32}$, and locally store a result $\Delta W_{D3'c}^{L32}$; and accelerators D4 in all the servers synchronize a parameter gradient $\Delta W_d$ corresponding to the fourth part d, that is, implement an all-reduce operation on $\Delta W_{D4\text{-}d}^{L32}$, for example, $\Delta W_{D4'd}^{L32} = \Delta W_{D4\text{-}d\text{-}M1}^{L32} + \Delta W_{D4\text{-}d\text{-}M2}^{L32}$, and locally store a result $\Delta W_{D4'd}^{L32}$. The four accelerators in each server each may update a parameter for which the four accelerators each are responsible, that is, a locally stored parameter based on the parameter gradients. The foregoing process is repeated, until the parameters of the 32 layers are updated.

$\Delta W_{D1\text{-}a\text{-}M1}^{L32}$ represents a parameter gradient that corresponds to the first part a of the parameter of the layer L32 and that is obtained after D1 in a server M1 completes reduce-scatter, and $\Delta W_{D1\text{-}a\text{-}M2}^{L32}$ represents a parameter gradient that corresponds to the first part a of the parameter of the layer L32 and that is obtained after D1 in a server M2 completes reduce-scatter. Another parameter is obtained by analogy.

In this way, when the server is a multi-network interface card server, a parameter gradient may be synchronized by using a plurality of network interface cards simultaneously, to reduce time costs, improve communication efficiency, and further improve model training efficiency. For example, the plurality of network interface cards are used to perform an all-reduce operation, to improve communication efficiency, and further improve cluster training performance.

In an implementation, after backward computation at one or more layers is completed, a reduce operation is performed on a parameter gradient between accelerators in a server, and a result is stored in one of the accelerators. An all-reduce operation is performed between corresponding accelerators in each server.

Optionally, synchronization of a parameter gradient and backward computation may be performed in serial, or may be performed in an overlapping manner.

Synchronization of a parameter gradient may include: The first accelerator receives the second parameter gradient sent by the another accelerator, or the first accelerator sends the first parameter gradient to the another accelerator.

That parameter gradient synchronization and backward computation are performed in serial means that, after synchronization of a parameter gradient of one or more layers is completed, backward computation at the one or more layers is performed.

For example, each accelerator performs backward computation at the $32^{nd}$ layer. After backward computation at the layer is completed, the accelerators perform synchronization of a parameter gradient. After synchronization of a parameter gradient at the $32^{nd}$ layer is completed, backward computation at the $31^{st}$ layer is performed, until the parameter of the entire model is updated.

For another example, each accelerator performs backward computation at the $32^{nd}$ layer and the $31^{st}$ layer. After backward computation at the $31^{st}$ layer is completed, the accelerators perform synchronization of a parameter gradient. After synchronization of a parameter gradient at the $32^{nd}$ layer and the $31^{st}$ layer is completed, backward computation at the $30^{th}$ layer is performed, until the parameter of the entire model is updated.

That synchronization of a parameter gradient and backward computation are performed in the overlapping manner means that, in a time period in which synchronization of a parameter gradient of one or more layers is completed, backward computation at the one or more layers is performed. In other words, before synchronization of a parameter of the one or more layers is completed, backward computation at the one or more layers is performed.

Alternatively, it may be understood that, in a time period in which the at least one first accelerator performs backward computation at any one or more layers before a $k^{th}$ layer in the neural network model, the at least one first accelerator sends a parameter gradient of the $k^{th}$ layer in the first parameter gradient to the another accelerator, or receives a parameter gradient, in the second parameter gradient, that is of the $k^{th}$ layer and that is sent by the another accelerator. Herein, k is a positive integer.

It should be noted that, synchronizing a parameter gradient of another layer in the time period of backward computation at the current layer may be understood as performing an operation of synchronizing the parameter gradient of the another layer in the time period of backward computation at the current layer. It is not specified that a time period in which the parameter gradient of the another layer is synchronized completely falls within the time period of backward computation at the current layer.

For example, each accelerator performs backward computation at the $32^{nd}$ layer. After backward computation at the layer is completed, the accelerators perform synchronization of a parameter gradient. Before synchronization of a parameter gradient at the $32^{nd}$ layer is completed, backward computation at the $31^{st}$ layer is performed, until the parameter of the entire model is updated.

For another example, each accelerator performs backward computation at the $32^{nd}$ layer and the $31^{st}$ layer. After backward computation at the $31^{st}$ layer is completed, the accelerators perform synchronization of a parameter gradient. Before synchronization of a parameter gradient at the $32^{nd}$ layer and the $31^{st}$ layer is completed, backward computation at the $30^{th}$ layer is performed, until the parameter of the entire model is updated.

Synchronization of a parameter gradient and backward computation are overlapped, to reduce the communication time period that cannot be hidden in the computation process, improve training efficiency, and improve training performance of the cluster.

As described above, the neural network model may be jointly trained by using a plurality of servers. The following separately describes implementations of synchronization of a parameter gradient in a single-network interface card scenario and a multi-network interface card scenario.

In the multi-network interface card scenario, a server includes a plurality of network interface cards. The server may be referred to as a multi-network interface card server.

In the single-network interface card scenario, a server includes one network interface card, or only one network interface card can work at a same moment. The server may be referred to as a single-network interface card server.

In Example 1, each accelerator may store a complete parameter gradient.

In the multi-network interface card scenario, parameter gradients of servers may be synchronized by using a plurality of network interface cards simultaneously.

For example, each accelerator in the server corresponds to one network interface card. For example, as shown in (a) in FIG. 13, four accelerators correspond to four network interface cards. After backward computation of the neural network model is completed, a reduce-scatter operation is performed between accelerators in the server. To be specific, summation processing is performed on parameter gradients generated on a plurality of accelerators in the server, the parameter gradients are segmented into N parts based on a parameter partition for which each accelerator is responsible, and the N parts are stored in corresponding accelerators. Therefore, each accelerator stores a parameter gradient sum corresponding to a parameter for which the accelerator is responsible. An all-reduce operation is performed between servers by using a network interface card corresponding to each accelerator.

Synchronization of a parameter gradient is performed simultaneously by using a plurality of network interface cards, to improve synchronization efficiency.

In the single-network interface card scenario, parameter gradients of servers may be synchronized by using the network interface card.

For example, the server includes one network interface card. As shown in (b) in FIG. 13, after backward computation of the neural network model is completed, a reduce operation is performed between accelerators in the server. To be specific, summation processing is performed on parameter gradients generated on a plurality of accelerators in the server, and then a parameter gradient sum is stored in one accelerator. An all-reduce operation is performed between servers by using the network interface card in the server.

In Example 2, each accelerator stores only a parameter gradient corresponding to a parameter for which the accelerator is responsible.

In the multi-network interface card scenario, parameter gradients of servers may be synchronized by using a plurality of network interface cards simultaneously.

For example, each accelerator in the server corresponds to one network interface card. For example, as shown in (a) in FIG. 13, four accelerators correspond to four network interface cards. After backward computation of one or more layers in the neural network model is completed, a reduce-scatter operation is performed between accelerators in the server. To be specific, summation processing is performed on parameter gradients generated on a plurality of accelerators in the server, the parameter gradients are segmented into N parts based on a parameter partition for which each accelerator is responsible, and the N parts are stored in corresponding accelerators. Therefore, each accelerator stores a parameter gradient sum corresponding to a parameter for which the accelerator is responsible. An all-reduce operation is performed between servers by using a network interface card corresponding to each accelerator.

Synchronization of a parameter gradient is performed simultaneously by using a plurality of network interface cards, to improve synchronization efficiency.

In the single-network interface card scenario, parameter gradients of servers may be synchronized by using the network interface card.

For example, the server includes one network interface card. For example, as shown in (b) in FIG. 13, after backward computation of one or more layers in the neural network model is completed, a reduce operation is performed between accelerators in the server. To be specific, summation processing is performed on parameter gradients generated on a plurality of accelerators in the server, and then a parameter gradient sum is stored in one accelerator. An all-reduce operation is performed between servers by using the network interface card in the server.

In this embodiment of this application, the first accelerator stores only a part of the neural network model, and obtains a required parameter from another accelerator before performing forward computation. Required memory is far less than memory required for storing a complete neural network model, to reduce storage pressure of the first accelerator, and avoid a case in which the neural network model cannot be trained due to insufficient memory of the first accelerator.

In addition, compared with an inter-layer segmentation manner, in this embodiment of this application in which a model parameter is stored in an intra-layer segmentation manner, the first accelerator obtains different parameters of a same layer from a plurality of accelerators, to obtain a complete parameter of the layer, so that a communication time period can be reduced, and processing efficiency can be improved. Further, communication congestion caused when a plurality of accelerators obtain a parameter from a same accelerator during distributed training can be avoided, and processing efficiency can be improved.

According to the solution in this embodiment of this application, the parameter obtained from the another device may be released after forward computation is completed, and a required parameter is obtained again in a backward computation process, to reduce storage space occupied by the parameter in the training process.

In addition, a parameter obtained from another device may be released after backward computation is completed, to further reduce the storage space occupied by the parameter in the training process, and reduce storage space occupied by the parameter in the entire training process. In this way, the first accelerator can support training simultaneously performed based on more training samples, to achieve better training performance.

In addition, in the solution of this embodiment of this application, a model state is stored in a plurality of accelerators in a distributed manner after intra-layer segmentation, and a complete model state does not need to be stored in each accelerator, to greatly save memory of the accelerator, so that the accelerator can support training performed based on a larger quantity of training samples, and performance of a trained model is improved.

In addition, a low-efficiency model parallel manner is replaced by the data parallel manner, and a problem that a model parameter is redundant in a data parallel training process is resolved. Memory (other than memory occupied by a feature) required by an accelerator used for training is greatly reduced, memory occupied in a neural network training process is greatly reduced, and training efficiency of cluster training is improved. In other words, in the solution of this embodiment of this application, training performance of hardware with a higher configuration can be achieved by using hardware with a smaller memory capacity.

In addition, distributed storage is performed by using an intra-layer segmentation model. When a server includes a plurality of network interface cards, parameter gradients of servers may be synchronized by using the plurality of network interface cards simultaneously, to improve communication efficiency and improve cluster training performance.

Figure 16:
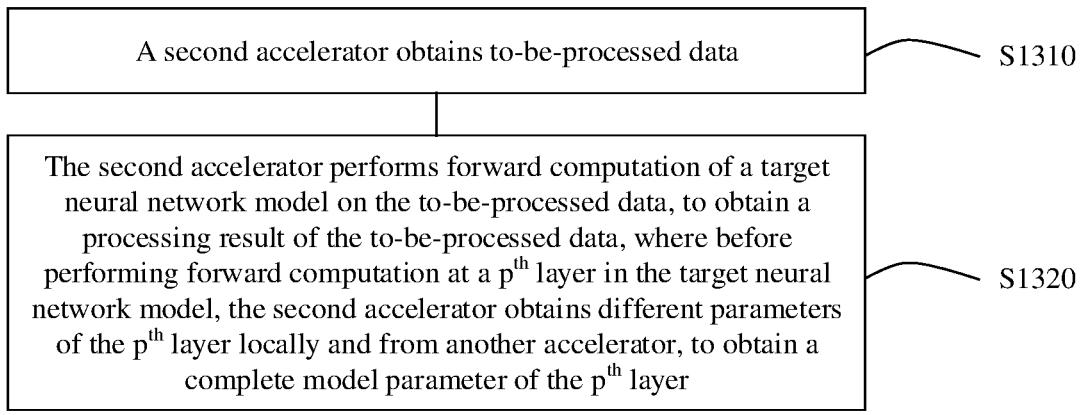
FIG. 16 is an example schematic flowchart of a data processing method according to an embodiment of this application.

FIG. 16 is a schematic flowchart of a data processing method 1300 according to an embodiment of this application. The method may be performed by an apparatus that can perform an operation of a neural network model. The apparatus may be a cloud service device, or may be a mobile terminal, for example, an apparatus such as a computer or a server whose operation capability is sufficient to perform the method 1300. For example, the method shown in FIG. 16 may be performed by the computing device 110 shown in FIG. 3, the neural-network processing unit 50 in FIG. 4, the server 400 in FIG. 5, the execution device 310 in FIG. 6, or the server 710, the server 720, or the server 730 in FIG. 7.

The method 1300 includes step 1310 and step 1320. The following describes step S1310 and step S1320.

S1310: Obtain to-be-processed data.

For example, the to-be-processed data may be data such as a to-be-processed image or a to-be-processed text. A type of the to-be-processed data is not limited in this embodiment of this application.

The to-be-processed image may be an image photographed by a terminal device (or another apparatus or device such as a computer or a server) by using a camera, or the to-be-processed image may be an image obtained from a terminal device (or another apparatus or device such as a computer or a server) (for example, an image stored in an album of the terminal device, or an image obtained by the terminal device from a cloud). This is not limited in this embodiment of this application.

S1320: A second accelerator performs forward computation of a target neural network model on the to-be-processed data, to obtain a processing result of the to-be-processed data, where before performing forward computation at a $p^{th}$ layer in the target neural network model, the second accelerator obtains different parameters of the $p^{th}$ layer locally and from another accelerator, to obtain a complete model parameter of the $p^{th}$ layer, where p is a positive integer.

The processing result of the to-be-processed data is related to a task to be processed by the target neural network model. For example, the to-be-processed data is a to-be-processed image, the target neural network model is an image recognition model, and a processing result of the to-be-processed image is a recognition result of the to-be-processed image; or the target neural network model is an image classification model, and a processing result of the to-be-processed image is a classification result of the to-be-processed image; or the target neural network model is a speech recognition model, the to-be-processed data is to-processed audio, and a processing result of the to-be-processed audio is a recognition result of the to-processed audio.

The different parameters of the $p^{th}$ layer are separately stored in a plurality of accelerators, some parameters of the $p^{th}$ layer are stored in the second accelerator, and the other parameters are separately stored in another accelerator. Before performing forward computation at the $p^{th}$ layer, the second accelerator needs to obtain the complete model parameter of the $p^{th}$ layer locally and from the another accelerator. The another accelerator is an accelerator that belongs to a same shared memory group as the second accelerator. For example, the different parameters of the $p^{th}$ layer are separately stored in N accelerators, and the N accelerators belong to one shared memory group. Before performing forward computation at the p layer, one (an example of the second accelerator) of the N accelerators needs to obtain the different parameters of the $p^{th}$ layer that are stored locally and in the other N−1 accelerators, to obtain the complete model parameter of the $p^{th}$ layer.

All layers whose parameter needs to be obtained from another accelerator in a forward computation process of the target neural network model may be understood as the $p^{th}$ layer. Before performing forward computation at any layer, if the second accelerator does not locally store a complete model parameter of the layer, the first accelerator may obtain different parameters of the layer locally and from the another accelerator, to obtain the complete model parameter of the layer.

The second accelerator and a first accelerator may be a same accelerator, or may be different accelerators.

In this embodiment of this application, the second accelerator stores only a part of the neural network model, and obtains a required parameter from another accelerator before performing forward computation. Required memory is far less than memory required for storing a complete neural network model, to reduce storage pressure of the second accelerator.

In addition, compared with an inter-layer segmentation manner, in a manner in which a parameter of the neural network model is stored in a plurality of accelerators after intra-layer segmentation, the second accelerator obtains different parameters of a same layer from a plurality of accelerators, to obtain a complete parameter of the layer, so that a communication time period can be reduced, and processing efficiency can be improved.

Optionally, after performing forward computation at the $p^{th}$ layer in the target neural network model, the second accelerator releases a parameter that is of the $p^{th}$ layer and that is obtained from the another accelerator.

According to the solution in this embodiment of this application, a parameter obtained from another device may be released after forward computation is completed, so that storage space occupied by the parameter in an operation process is reduced. In the solution of this embodiment of this application, operation performance of hardware with a higher configuration can be achieved by using hardware with a smaller memory capacity.

Optionally, in a time period in which the second accelerator performs forward computation at any one or more layers before the $p^{th}$ layer in the target neural network model, the second accelerator obtains the different parameters of the $p^{th}$ layer locally and from the another accelerator, to obtain the complete model parameter of the $p^{th}$ layer.

It should be noted that, obtaining a parameter of another layer in a time period of forward computation at a current layer may be understood as performing an operation of obtaining the parameter of the another layer in the time period of forward computation at the current layer. It is not specified that a time period in which the parameter of the another layer is obtained completely falls within the time period of forward computation at the current layer.

Obtaining a parameter and forward computation are overlapped, to reduce a communication time period that cannot be hidden in a computation process, improve inference efficiency, and reduce time costs.

For a specific description of forward computation of the target neural network model, refer to step S1020 in the method 1000.

Further, the target neural network used in the data processing method 1300 in FIG. 16 may be constructed in the method in FIG. 8. For a specific implementation in the method 1300, refer to the method 1000. To avoid unnecessary repetition, repeated descriptions are properly omitted when the method 1300 is described below.

Optionally, a parameter of the target neural network model is obtained by updating a parameter of a neural network model by each of at least one first accelerator based on a first parameter gradient of the neural network model, the first parameter gradient of the neural network model is obtained by performing backward computation by the at least one first accelerator based on a forward computation result, the forward computation result is obtained by performing forward computation of the neural network model on at least one training sample by each of the at least one first accelerator, and a complete model parameter of an $i^{th}$ layer in the neural network model is obtained by obtaining different parameters of the $i^{th}$ layer locally and from another accelerator.

Optionally, when the at least one first accelerator performs backward computation at a $j^{th}$ layer in the neural network model, a complete model parameter of the $j^{th}$ layer in the neural network model is obtained by obtaining different parameters of the $j^{th}$ layer locally and from the another accelerator.

Optionally, the complete model parameter of the $j^{th}$ layer is obtained in a time period in which the at least one first accelerator performs backward computation at any one or more layers after the $j^{th}$ layer in the neural network model.

Optionally, the at least one first accelerator is located in a first server.

Optionally, that a parameter of the target neural network model is obtained by updating a parameter of a neural network model by each of at least one first accelerator based on a first parameter gradient of the neural network model includes:

The parameter of the target neural network model is obtained by updating the parameter of the neural network model by each of the at least one first accelerator based on the first parameter gradient of the neural network model and a second parameter gradient of the neural network model, and the second parameter gradient of the neural network model includes a parameter gradient that is sent by the another accelerator and that is received by the at least one first accelerator.

Optionally, the at least one first accelerator includes two or more first accelerators, and the second parameter gradient of the neural network model includes a parameter gradient that is sent by another accelerator in another server and that is simultaneously received by the at least one first accelerator.

The following describes an apparatus in embodiments of this application with reference to FIG. 17 to FIG. 20. It should be understood that the following described apparatus can perform the method in embodiments of this application. To avoid unnecessary repetition, repeated descriptions are properly omitted when the apparatus in embodiments of this application is described below.

Figure 17:
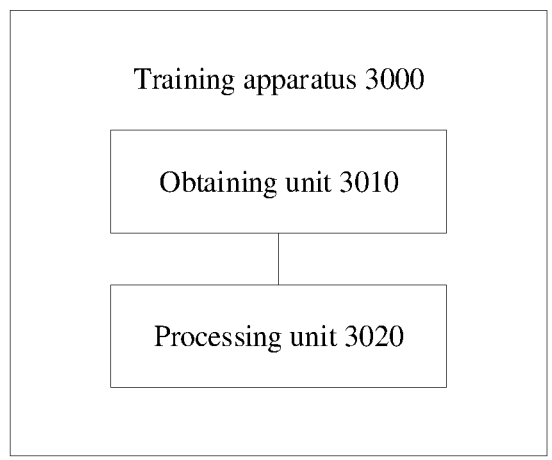
FIG. 17 is an example schematic block diagram of a neural network model training apparatus according to an embodiment of this application.

FIG. 17 is a schematic block diagram of a neural network model training apparatus according to an embodiment of this application. The training apparatus 3000 shown in FIG. 17 includes an obtaining unit 3010 and a processing unit 3020.

The obtaining unit 3010 and the processing unit 3020 may be configured to perform the neural network model training method in embodiments of this application, and may be specifically configured to perform the method 1000.

The obtaining unit 3010 is configured to obtain at least one training sample.

The processing unit 3020 is configured to: perform forward computation of a neural network model on the at least one training sample, to obtain a forward computation result, where before forward computation at an $i^{th}$ layer in the neural network model is performed, the obtaining unit 3010 obtains different parameters of the $i^{th}$ layer locally and from another accelerator, to obtain a complete model parameter of the $i^{th}$ layer, where i is a positive integer; perform backward computation based on the forward computation result, to obtain a first parameter gradient of the neural network model; and update a parameter of the neural network model based on the first parameter gradient of the neural network model.

Optionally, in an embodiment, the processing unit 3020 is further configured to: after performing forward computation at the $i^{th}$ layer in the neural network model, release a parameter that is of the $i^{th}$ layer and that is obtained from the another accelerator.

Optionally, in an embodiment, the obtaining unit 3010 is specifically configured to: before backward computation at a $j^{th}$ layer in the neural network model is performed, obtain different parameters of the $j^{th}$ layer locally and from another first accelerator, to obtain a complete model parameter of the $j^{th}$ layer, where j is a positive integer.

Optionally, in an embodiment, the processing unit 3020 is further configured to: after performing backward computation at the $j^{th}$ layer in the neural network model, release a parameter that is of the $j^{th}$ layer and that is obtained from the another accelerator.

Optionally, in an embodiment, the obtaining unit 3010 is specifically configured to: in a time period in which backward computation at any one or more layers after the $j^{th}$ layer in the neural network model is performed, obtain the different parameters of the $j^{th}$ layer locally and from the another accelerator, to obtain the complete model parameter of the $j^{th}$ layer.

Optionally, in an embodiment, the obtaining unit 3010 is specifically configured to: in a time period in which forward computation at any one or more layers before the $i^{th}$ layer in the neural network model is performed, obtain the different parameters of the $i^{th}$ layer locally and from the another accelerator, to obtain the complete model parameter of the $i^{th}$ layer.

Optionally, in an embodiment, the apparatus further includes a sending unit, configured to send the first parameter gradient to the another accelerator.

Optionally, in an embodiment, the sending unit is specifically configured to send a parameter gradient of a $k^{th}$ layer in the first parameter gradient to the another accelerator in a time period in which backward computation at any one or more layers before the $k^{th}$ layer in the neural network model is performed, where k is a positive integer.

Optionally, in an embodiment, the obtaining unit 3010 is further configured to receive a second parameter gradient that is of the neural network model and that is sent by the another accelerator; and the processing unit 3020 is specifically configured to update the parameter of the neural network model based on the first parameter gradient of the neural network model and the second parameter gradient of the neural network model.

Optionally, in an embodiment, the processing unit 3020 is specifically configured to receive, simultaneously as another accelerator located in a same server, the second parameter gradient that is of the neural network model and that is sent by an accelerator in another server.

Figure 18:
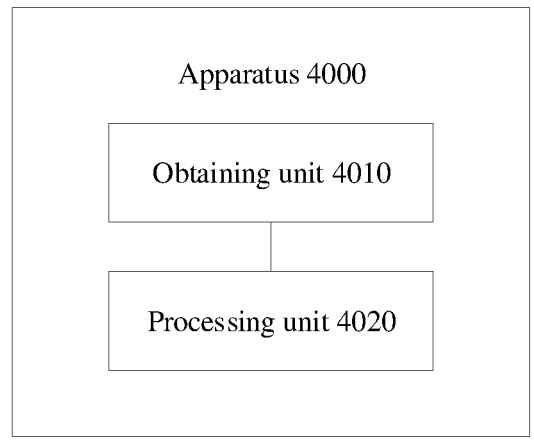
FIG. 18 is an example schematic block diagram of an image processing apparatus according to an embodiment of this application.

FIG. 18 is a schematic block diagram of an image processing apparatus according to an embodiment of this application. The apparatus 4000 shown in FIG. 18 includes an obtaining unit 4010 and a processing unit 4020.

The obtaining unit 4010 and the processing unit 4020 may be configured to perform the image processing method in embodiments of this application, for example, may be configured to perform the method 1300.

The obtaining unit 4010 is configured to obtain a to-be-processed image.

The processing unit 4020 is configured to perform forward computation of a target neural network model on the to-be-processed image, to obtain a processing result of the to-be-processed image, where before forward computation at a $p^{th}$ layer in the target neural network model is performed, the obtaining unit 4010 obtains different parameters of the $p^{th}$ layer locally and from another accelerator, to obtain a complete model parameter of the $p^{th}$ layer, where p is a positive integer.

Optionally, in an embodiment, the processing unit 4020 is further configured to: after performing forward computation at the $p^{th}$ layer in the target neural network model, release a parameter that is of the $p^{th}$ layer and that is obtained from the another accelerator.

Optionally, in an embodiment, the obtaining unit 4010 is specifically configured to: in a time period in which forward computation at any one or more layers before the $p^{th}$ layer in the target neural network model is performed, obtain the different parameters of the $p^{th}$ layer locally and from the another accelerator, to obtain the complete model parameter of the $p^{th}$ layer.

Optionally, in an embodiment, a parameter of the target neural network model is obtained by updating a parameter of a neural network model by each of at least one first accelerator based on a first parameter gradient of the neural network model, the first parameter gradient of the neural network model is obtained by performing backward computation by the at least one first accelerator based on a forward computation result, the forward computation result is obtained by performing forward computation of the neural network model on at least one training sample by each of the at least one first accelerator, and a complete model parameter of an $i^{th}$ layer in the neural network model is obtained by obtaining different parameters of the $i^{th}$ layer locally and from another accelerator.

Optionally, in an embodiment, when the at least one first accelerator performs backward computation at a $j^{th}$ layer in the neural network model, a complete model parameter of the $j^{th}$ layer in the neural network model is obtained by obtaining different parameters of the $j^{th}$ layer locally and from the another accelerator.

Optionally, in an embodiment, the complete model parameter of the $j^{th}$ layer is obtained in a time period in which the at least one first accelerator performs backward computation at any one or more layers after the $j^{th}$ layer in the neural network model.

Optionally, in an embodiment, the at least one first accelerator is located in a first server.

Optionally, in an embodiment, that a parameter of the target neural network model is obtained by updating a parameter of a neural network model by each of at least one first accelerator based on a first parameter gradient of the neural network model includes: The parameter of the target neural network model is obtained by updating the parameter of the neural network model by each of the at least one first accelerator based on the first parameter gradient of the neural network model and a second parameter gradient of the neural network model, and the second parameter gradient of the neural network model includes a parameter gradient that is sent by the another accelerator and that is received by the at least one first accelerator.

Optionally, in an embodiment, the at least one first accelerator includes two or more first accelerators, and the second parameter gradient of the neural network model includes a parameter gradient that is sent by another accelerator in another server and that is simultaneously received by the at least one first accelerator.

It should be noted that the training apparatus 3000 and the apparatus 4000 are embodied in a form of a functional unit. The term "unit" herein may be implemented in a form of software and/or hardware. This is not specifically limited.

For example, the "unit" may be a software program, a hardware circuit, or a combination thereof for implementing the foregoing function. The hardware circuit may include an application-specific integrated circuit (ASIC), an electronic circuit, a processor (for example, a shared processor, a dedicated processor, or a group processor) configured to execute one or more software or firmware programs and a memory, a combined logic circuit, and/or other proper components that support the described functions.

Therefore, the units in the examples described in embodiments of this application can be implemented by using electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 19:
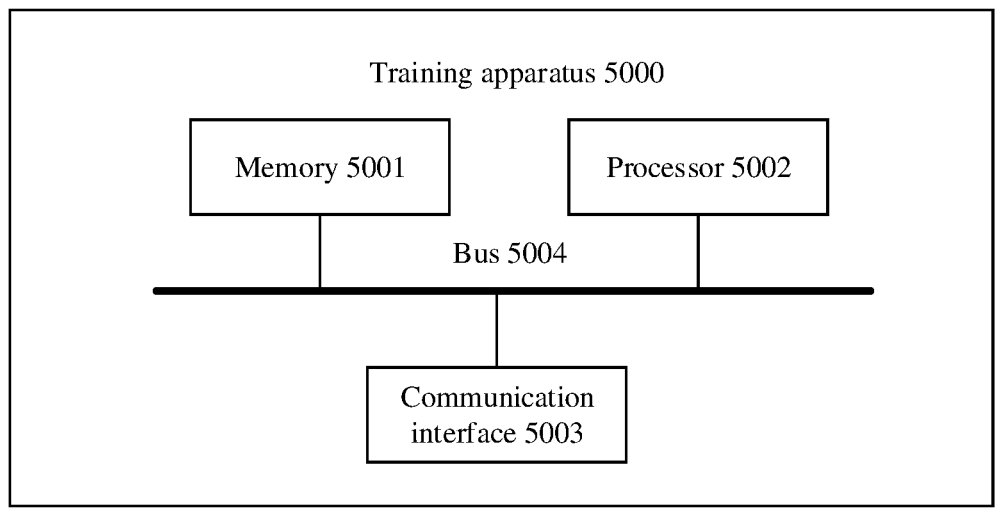
FIG. 19 is an example schematic block diagram of a neural network model training apparatus according to an embodiment of this application.

FIG. 19 is a schematic diagram of a hardware structure of a neural network model training apparatus according to an embodiment of this application. A training apparatus 5000 (the apparatus 5000 may be specifically a computer device) shown in FIG. 19 includes a memory 5001, a processor 5002, a communication interface 5003, and a bus 5004. The memory 5001, the processor 5002, and the communication interface 5003 are communicatively connected to each other through the bus 5004.

The memory 5001 may be a read-only memory (ROM), a static storage device, a dynamic storage device, or a random access memory (RAM). The memory 5001 may store a program. When the program stored in the memory 5001 is executed by the processor 5002, the processor 5002 is configured to perform steps of the neural network model training method in embodiments of this application. Specifically, the processor 5002 may perform step S1020 to step S1040 in the method shown in FIG. 8.

The processor 5002 may be a general-purpose central processing unit (CPU), a microprocessor, an application-specific integrated circuit (ASIC), a graphics processing unit (GPU), or one or more integrated circuits, and is configured to execute a related program, to implement the neural network model training method in the method embodiments of this application.

The processor 5002 may alternatively be an integrated circuit chip, and has a signal processing capability, for example, may be the chip shown in FIG. 4. In an implementation process, steps of the neural network model training method in this application may be completed by using a hardware integrated logic circuit in the processor 5002 or by using instructions in a form of software.

The processor 5002 may alternatively be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 5002 may implement or perform the methods, steps, and logical block diagrams that are disclosed in embodiments of this application. The general-purpose processor may be a microprocessor, or the processor may be any conventional processor, or the like. The steps in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 5001. The processor 5002 reads information in the memory 5001, and completes, in combination with hardware of the processor 5002, functions that need to be performed by the units included in the training apparatus shown in FIG. 17, or performs the neural network model training method shown in FIG. 8 in the method embodiments of this application.

The communication interface 5003 implements communication between the apparatus 5000 and another device or a communication network by using a transceiver apparatus including but not limited to a transceiver. For example, a training sample, a model parameter, or the like may be obtained through the communication interface 5003.

The bus 5004 may include a path for information transfer between various components (for example, the memory 5001, the processor 5002, and the communication interface 5003) of the apparatus 5000.

Figure 20:
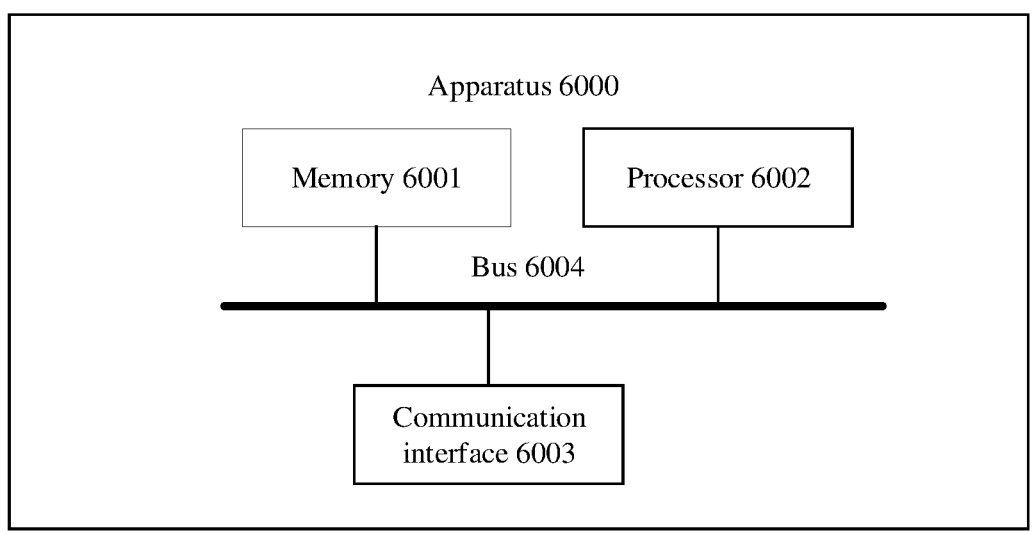
FIG. 20 is an example schematic block diagram of an image processing apparatus according to an embodiment of this application.

FIG. 20 is a schematic diagram of a hardware architecture of an image processing apparatus according to an embodiment of this application. The apparatus 6000 shown in FIG. 20 includes a memory 6001, a processor 6002, a communication interface 6003, and a bus 6004. The memory 6001, the processor 6002, and the communication interface 6003 are communicatively connected to each other through the bus 6004.

The memory 6001 may be a ROM, a static storage device, or a RAM. The memory 6001 may store a program. When the program stored in the memory 6001 is executed by the processor 6002, the processor 6002 and the communication interface 6003 are configured to perform steps of the image processing method in embodiments of this application. Specifically, the processor 6002 may perform step S1320 in the method shown in FIG. 16.

The processor 6002 may be a general-purpose CPU, a microprocessor, an ASIC, a GPU, or one or more integrated circuits, and is configured to execute a related program, to implement functions that need to be performed by the units in the image processing apparatus in embodiments of this application, or perform the image processing method in the method embodiments of this application.

The processor 6002 may alternatively be an integrated circuit chip, and has a signal processing capability, for example, may be the chip shown in FIG. 4. In an implementation process, steps of the image processing method in embodiments of this application may be completed by using a hardware integrated logic circuit in the processor 6002 or by using instructions in a form of software.

The processor 6002 may alternatively be a general-purpose processor, a DSP, an ASIC, an FPGA or another programmable logic device, a discrete gate or transistor logic device, or a discrete hardware component. The processor 6002 may implement or perform the methods, steps, and logical block diagrams that are disclosed in embodiments of this application. The general-purpose processor may be a microprocessor, or the processor may be any conventional processor, or the like. The steps in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 6001. The processor 6002 reads information in the memory 6001, and completes, in combination with hardware of the processor 6002, functions that need to be performed by the units included in the image processing apparatus shown in FIG. 18, or performs the image processing method shown in FIG. 18.

The communication interface 6003 implements communication between the apparatus 6000 and another device or a communication network by using a transceiver apparatus including but not limited to a transceiver. For example, a to-be-processed image may be obtained through the communication interface 6003.

The bus 6004 may include a path for information transfer between various components (for example, the memory 6001, the processor 6002, and the communication interface 6003) of the apparatus 6000.

It should be noted that, although only the memory, the processor, and the communication interface of each of the apparatus 5000 and the apparatus 6000 are shown, in a specific implementation process, a person skilled in the art should understand that the apparatus 5000 and the apparatus 6000 each may further include another component necessary for normal running. In addition, based on a specific requirement, a person skilled in the art should understand that the apparatus 5000 and the apparatus 6000 each may further include a hardware component for implementing another additional function. In addition, a person skilled in the art should understand that the apparatus 5000 and the apparatus 6000 each may include only a component necessary for implementing embodiments of this application, but do not necessarily include all the components shown in FIG. 19 and FIG. 20.

It should be understood that, the processor in embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor, or the like.

It should be further understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example rather than limitation, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware, firmware, or any combination thereof. When software is used to implement embodiments, the foregoing embodiments may be all or partially implemented in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, and microwave, or the like) manner. The computer-readable storage medium may be any usable medium that can be accessed by the computer, or a data storage device, for example, a server or a data center in which one or more usable media are integrated. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that at least three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (e.g., pieces)" or a similar expression thereof indicates any combination of these items, including a single item (e.g., piece) or any combination of a plurality of items (e.g., pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement, to achieve objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that may store program code such as a USB flash drive, a removable hard disk, a read-only memory (ROM), a random access memory (RAM), a magnetic disk, or an optical disc.

The foregoing descriptions include specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A neural network model training method, comprising:
    obtaining, by at least one first accelerator, at least one training sample;
    obtaining a forward computation result by performing, by the at least one first accelerator, forward computation of a neural network model on the at least one training sample, wherein
        before performing the forward computation at an $i^{th}$ layer in the neural network model, the at least one first accelerator obtains a complete model parameter of the $i^{th}$ layer by obtaining different parameters of the $i^{th}$ layer locally and from another accelerator, wherein i is a positive integer;
    obtaining a first parameter gradient of the neural network model by performing, by the at least one first accelerator, backward computation based on the forward computation result; and
    updating, by the at least one first accelerator, a parameter of the neural network model based on the first parameter gradient of the neural network model.

2. The method according to claim 1, further comprising:
    after performing the forward computation at the $i^{th}$ layer in the neural network model, releasing, by the at least one first accelerator, a parameter of the $i^{th}$ layer obtained from the another accelerator.

3. The method according to claim 1, wherein before performing the backward computation at a $j^{th}$ layer in the neural network model, the at least one first accelerator obtains a complete model parameter of the $i^{th}$ layer by obtaining different parameters of the $j^{th}$ layer locally and from another first accelerator, wherein j is a positive integer.

4. The method according to claim 1, wherein in a time period in which the at least one first accelerator performs the forward computation at any one or more layers before the $i^{th}$ layer in the neural network model, the at least one first accelerator obtains the complete model parameter of the $i^{th}$ layer by obtaining the different parameters of the $i^{th}$ layer locally and from the another accelerator.

5. The method according to claim 1, wherein the at least one first accelerator is located in a first server.

6. The method according to claim 1, further comprising:
sending, by the at least one first accelerator, the first parameter gradient to the another accelerator.

7. The method according to claim 6, wherein the at least one first accelerator sends a parameter gradient of a $k^{th}$ layer in the first parameter gradient to the another accelerator in a time period in which the at least one first accelerator performs the backward computation at any one or more layers before the $k^{th}$ layer in the neural network model, wherein k is a positive integer.

8. The method according to claim 1, further comprising:
receiving, by the at least one first accelerator, a second parameter gradient of the neural network model sent by the another accelerator; and
updating, by the at least one first accelerator, the parameter of the neural network model based on the first parameter gradient of the neural network model comprises:
updating, by the at least one first accelerator, the parameter of the neural network model based on the first parameter gradient of the neural network model and the second parameter gradient of the neural network model.

9. An image processing method, comprising:
obtaining, by a second accelerator, a to-be-processed image; and
obtaining a processing result of the to-be-processed image by performing, by the second accelerator, forward computation of a target neural network model on the to-be-processed image, wherein
before performing the forward computation at a $p^{th}$ layer in the target neural network model, the second accelerator obtains a complete model parameter of the $p^{th}$ layer by obtaining different parameters of the $p^{th}$ layer locally and from another accelerator, wherein p is a positive integer.

10. The method according to claim 9, wherein after performing the forward computation at the $p^{th}$ layer in the target neural network model, the second accelerator releases a parameter of the $p^{th}$ layer obtained from the another accelerator.

11. The method according to claim 9, wherein in a time period in which the second accelerator performs the forward computation at any one or more layers before the $p^{th}$ layer in the target neural network model, the second accelerator obtains the complete model parameter of the $p^{th}$ layer by obtaining the different parameters of the $p^{th}$ layer locally and from the another accelerator.

12. The method according to claim 9, further comprising:
obtaining a parameter of the target neural network model by updating a parameter of a neural network model by at least one first accelerator based on a first parameter gradient of the neural network model;
obtaining the first parameter gradient of the neural network model by performing backward computation by the at least one first accelerator based on a forward computation result;
obtaining the forward computation result by performing the forward computation of the neural network model on at least one training sample by the at least one first accelerator; and
obtaining a complete model parameter of an $i^{th}$ layer in the neural network model by obtaining different parameters of the $i^{th}$ layer locally and from the another accelerator.

13. The method according to claim 12, further comprising:
when the at least one first accelerator performs the backward computation at a $j^{th}$ layer in the neural network model, obtaining a complete model parameter of the $j^{th}$ layer in the neural network model by obtaining different parameters of the $j^{th}$ layer locally and from the another accelerator.

14. The method according to claim 13, further comprising obtaining the complete model parameter of the $j^{th}$ layer in a time period in which the at least one first accelerator performs the backward computation at any one or more layers after the $j^{th}$ layer in the neural network model.

15. The method according to claim 12, wherein the parameter of the target neural network model being obtained by updating the parameter of the neural network model by the at least one first accelerator based on the first parameter gradient of the neural network model comprises:
obtaining the parameter of the target neural network model by updating the parameter of the neural network model by the at least one first accelerator based on the first parameter gradient of the neural network model and a second parameter gradient of the neural network model, wherein
the second parameter gradient of the neural network model comprises a parameter gradient sent by the another accelerator and received by the at least one first accelerator.

16. A neural network model training apparatus, comprising:
a processor; and
a memory configured to store computer readable instructions that, when executed by the processor, cause the apparatus to:
obtain at least one training sample;
obtain a forward computation result by performing forward computation of a neural network model on the at least one training sample, wherein
before performing the forward computation at an $i^{th}$ layer in the neural network model, a complete model parameter of the $i^{th}$ layer is obtained by obtaining different parameters of the $i^{th}$ layer locally and from another accelerator, wherein i is a positive integer;
obtain a first parameter gradient of the neural network model by performing backward computation based on the forward computation result; and
update a parameter of the neural network model based on the first parameter gradient of the neural network model.

17. The apparatus according to claim 16, wherein the apparatus is further caused to:
after performing the forward computation at the $i^{th}$ layer in the neural network model, release a parameter of the $i^{th}$ layer obtained from the another accelerator.

18. The apparatus according to claim 16, wherein the apparatus is further caused to:
before the backward computation at a $j^{th}$ layer in the neural network model is performed, obtain a complete model parameter of the $j^{th}$ layer by obtaining different parameters of the $j^{th}$ layer locally and from a first accelerator, wherein j is a positive integer.

19. The apparatus according to claim 18, wherein the apparatus is further caused to:
after performing the backward computation at the $j^{th}$ layer in the neural network model, release a parameter of the $j^{th}$ layer obtained from the another accelerator.

20. The apparatus according to claim 18, wherein the apparatus is further configured to:
in a time period in which the backward computation at any one or more layers after the $j^{th}$ layer in the neural network model is performed, obtain the complete model parameter of the $i^{th}$ layer by obtaining the different parameters of the $j^{th}$ layer locally and from the another accelerator.

* * * * *